US006993462B1

(12) United States Patent
Pavlović et al.

(10) Patent No.: US 6,993,462 B1
(45) Date of Patent: *Jan. 31, 2006

(54) METHOD FOR MOTION SYNTHESIS AND INTERPOLATION USING SWITCHING LINEAR DYNAMIC SYSTEM MODELS

(75) Inventors: Vladimir Pavlović, Melrose, MA (US); James Matthew Rehg, Arlington, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1180 days.

This patent is subject to a terminal disclaimer.

(21) Appl. No.: 09/654,401

(22) Filed: Sep. 1, 2000

Related U.S. Application Data

(60) Provisional application No. 60/154,384, filed on Sep. 16, 1999.

(51) Int. Cl.
*G06F 17/10* (2006.01)
(52) U.S. Cl. .......................... 703/2; 382/103; 382/107; 700/29; 703/6
(58) Field of Classification Search .................. 703/6, 703/2; 700/29; 382/103, 107
See application file for complete search history.

(56) References Cited

U.S. PATENT DOCUMENTS

| | | | |
|---|---|---|---|
| 5,325,098 A | 6/1994 | Blair et al. | |
| 5,923,712 A | 7/1999 | Leyendecker et al. | |
| 6,064,703 A | 5/2000 | Cusani et al. | |
| 6,226,409 B1 | 5/2001 | Cham et al. | |
| 6,243,037 B1 | 6/2001 | Pulford et al. | |
| 6,256,418 B1 | 7/2001 | Rehg et al. | |
| 6,314,204 B1 | 11/2001 | Cham et al. | |
| 6,393,046 B1 | 5/2002 | Kohli et al. | |
| 6,396,878 B1 | 5/2002 | Piirainen | |
| 6,480,876 B2 | 11/2002 | Rehg et al. | |
| 6,580,810 B1 * | 6/2003 | Yang et al. | 382/103 |
| 6,591,146 B1 * | 7/2003 | Pavlovic et al. | 700/29 |

OTHER PUBLICATIONS

Ghahramani, "Learning Dynamic Bayesian Networks", in Giles et al. editors, Adaptive Processing of Temporal Information, Lecture Notes in Artificial Intelligence, Springer-Verlag, 1997, pp. 168-197.*
Boyen et al., "Tractable Inference for Complex Stochastic Processes", Proceedings of the Fourteenth Conference on Uncertainty in Artificial Intelligence, 1998, pp. 33-42.*
Pavlovic et al., "Variational Learning in Mixed-State Dynamic Graphical Models", Proceedings of the Fifteenth Conference on Uncertainty in Artificial Intelligence, 1999, pp. 522-530.*

(Continued)

*Primary Examiner*—Jean R. Homere
*Assistant Examiner*—Herng-der Day
(74) *Attorney, Agent, or Firm*—Richard P. Lange

(57) ABSTRACT

A method for synthesizing a sequence includes defining a switching linear dynamic system (SLDS) with a plurality of dynamic systems. In a Viterbi-based method, a state transition record for a training sequence is determined. The corresponding sequence of switching states is determined by backtracking through the state transition record. Parameters of dynamic models are learned in response to the determined sequence of switching states, and a new data sequence is synthesized, based on the dynamic models whose parameters have been learned. In a variational-based method, the switching state at a particular instance is determined by a switching model. The dynamic models are decoupled from the switching model, and parameters of the decoupled dynamic model are determined responsive to a switching state probability estimate. Similar methods are used to interpolate from an input sequence.

72 Claims, 18 Drawing Sheets

OTHER PUBLICATIONS

Murphy, Kevin P., *Switching Kalman Filters,* Aug. 21, 1998, pp. 1-16.

Murphy, Kevin P., *Inference and Learning in Hybrid Bayesian Networks,* Report No. UCB/CSD-98-990, Jan. 1998, pp. 1-18.

Ghahramani, Zoubin and Hinton, G.E., *Variational Learning for Switching State-Space Models,* Gatsby Computational Neuroscience Unit, , pp. 1-26.

Pavlović, Vladimir, et al., *Time-Series Classification Using Mixed-State Dynamic Bayesian Networks,* In Computer Vision and Pattern Recognition, pp. 609-615, Jun. 1999.

Pavlović, Vladimir, et al., A Dynamic Bayesian Network Approach to Figure Tracking Using Learned Dynamic Models.

Welch, Greg and Bishop, Gary, *An Introduction to the Kalman Filter,* Department of Computer Science, Univ. of North Carolina at Chapel Hill, Chapel Hill, NC 27599-3175, Sep. 17, 1997, pp. 1-16.

http://www.scs.leeds.ac.uk/scs-only/teaching-materials/HiddenMarkovModels/html_dev/main.html.

Shumway, R.H. and Stoffer, D.S., *Dynamic Linear Models with Switching* Journal of the American Statistical Association, Sep. 1991, vol. 86, No. 415.

Bar-Shalom Y, Li, X-R, *Estimation & Tracking: principles, techniques, and software.* YBS, Storrs, CT. 1998, pp. 446-484.

Jordan, M.I., et al., *An Inroduction to Variational Methods for Graphical Models,* Oct. 11, 1999, http://www.stat.berkeley, edu/tech-reports/index.html, Report#508.

Ghahramani, Z., et al., *Switching State-Space Models,* pp. 1-23. Technical Report CRG-TR-96-3, Dept. of Computer Science, University of Toronto.

Rabiner, L.R. and Juang, B.H., *An Introduction to Hidden Markov Models,* IEEE ASSP Magazine, Jan. 1986, pp. 4-16.

Kim, Chang-Jin, *Dynamic Linear Models with Markov-Switching,* Journal of Econometrics 60, (1994) pp. 1-22.

Krishnamurthy, V. and Evans, J., *Finite-Dimensional Filters for Passive Tracking of Markov Jump Linear Systems,* Automatica, vol. 34, No. 6, pp. 765-770, 1998.

Minka, Thomas P., *From Hidden Markov Models to Linear Dynamical Systems,* pp. 1-10. ftp://vismod.www.media.mit.edu/pub/tpminka/papers/minka-lds.-tut.ps.gz.

Ghahramani, Z. and Hinton G.E., *Parameter Estimation for Linear Dynamical Systems,* pp. 1-6, Technical Report CRG-TR-96-2, Dept. of Computer Science, University of Toronto.

*A Brief Introduction to Graphical Models and Bayesian Networks,* http://www.cs.berkeley.edu/~murphyk/Bayes/bayes.html, pp. 1-19.

Maybeck, P.S., *Stochastic Models, Estimation, and Control,* vol. I Academic Press, 1979.

* cited by examiner

METHOD FOR MOTION SYNTHESIS AND INTERPOLATION USING SWITCHING LINEAR DYNAMIC SYSTEM MODELS

RELATED APPLICATIONS

This Application claims the benefit of U.S. Provisional Application No. 60/154,384, filed Sep. 16, 1999, the entire teachings of which are incorporated herein by reference.

BACKGROUND OF THE INVENTION

Technologies for analyzing the motion of the human figure play a key role in a broad range of applications, including computer graphics, user-interfaces, surveillance, and video editing.

A motion of the figure can be represented as a trajectory in a state space which is defined by the kinematic degrees of freedom of the figure. Each point in state space represents a single configuration or pose of the figure. A motion such as a plié in ballet is described by a trajectory along which the joint angles of the legs and arms change continuously.

A key issue in human motion analysis and synthesis is modeling the dynamics of the figure. While the kinematics of the figure define the state space, the dynamics define which state trajectories are possible (or probable).

Since the key problem in synthesizing figure motion for animation is to achieve realistic dynamics, the importance of dynamic modeling is obvious. The challenge in animation is to produce motion with natural dynamics that satisfy constraints placed by the animator. Some constraints result from basic physical realities such as the noninterpenetration of objects. Others are artistic in nature, such as a desired head pose during a dance move. The key problem in synthesis is to find a trajectory in the set of dynamically realistic trajectories that satisfies the desired constraints.

Prior Approaches

Most previous work on synthesizing figure motion employs one of two types of dynamic models: analytic and learned. Analytic models are specified by a human designer. They are typically second order differential equations relating joint torque, mass, and acceleration. Learned models, on the other hand, are constructed automatically from examples of human motion data.

Analytic Dynamic Models

The prior art includes a range of hand-specified analytic dynamical models. On one end of the spectrum are simple generic dynamic models based, for example, on constant velocity assumptions. Complex, highly specific models occupy the other end.

A number of proposed figure trackers use a generic dynamic model based on a simple smoothness prior such as a constant velocity Kalman filter. See, for example, Ioannis A. Kakadiaris and Dimitris Metaxas, "Model-based estimation of 3D human motion with occlusion based on active multi-viewpoint selection," Computer Vision and pattern Recognition, pages 81–87, San Franciso, Calif., Jun. 18–20, 1996. Such models fail to capture subtle differences in dynamics across different motion types, such as walking or running. It is unlikely that these models can provide a strong constraint on complex human motion such as dance.

The field of biomechanics is a source of more complex and realistic models of human dynamics. From the biomechanics point of view, the dynamics of the figure are the result of its mass distribution, joint torques produced by the motor control system, and reaction forces resulting from contact with the environment, e.g., the floor. Research efforts in biomechanics, rehabilitation, and sports medicine have resulted in complex, specialized models of human motion. For example, entire books have been written on the subject of walking. See, for example, Inman, Ralston and Todd, "Human Walking," Williams and Wilkins, 1981.

The biomechanical approach has two drawbacks for analysis and synthesis applications. First, the dynamics of the figure are quite complex, involving a large number of masses and applied torques, along with reaction forces which are difficult to measure. In principle, all of these factors must be modeled or estimated in order to produce physically-valid dynamics. Second, in some applications we may only be interested in a small set of motions, such as a vocabulary of gestures. In the biomechanical approach, it may be difficult to reduce the complexity of the model to exploit this restricted focus. Nonetheless, these models have been applied to tracking and synthesis applications.

Wren and Pentland, "Dynamic models of human motion", Proceeding of the Third International Conference on Automatic Face and Gesture Recognition, pages 22–27, Nara, Japan, 1998, explored visual tracking using a biomechanically-derived dynamic model of the upper body. The unknown joint torques were estimated along with the state of the arms and head in an input estimation framework. A Hidden Markov Model (HMM) was trained to represent plausible sequences of input torques. Due to the simplicity of their experimental domain, there was no need to model reaction forces between the figure and its environment.

This solution suffers from the limitations of the biomechanical approach outlined above. In particular, describing the entire body would require a significant increase in the complexity of the model. Even more problematic is the treatment of the reaction forces, such as those exerted by the floor on the soles of the feet during walking or running.

Biomechanically-derived dynamic models have also been applied to the problem of synthesizing athletic motion, such as bike racing or sprinting, for computer graphics animations. See, for example, Hodgins, Wooten, Brogan and O'Brien, "Animating human athletics," Computer Graphics (Proc. SIGGRAPH '95), pages 71–78, 1995. In the present invention, there is, in addition to the usual problems of complex dynamic modeling, the need to design control programs that produce the joint torques that drive the figure model. In this approach, it is difficult to capture more subtle aspects of human motion without some form of automated assistance. The motions that result tend to appear very regular and robotic, lacking both the randomness and fluidity associated with natural human motion.

Learned Dynamic Models

The approaches to figure motion synthesis using learned dynamic models are based on synthesizing motion using dynamic models whose parameters are learned from a corpus of sample motions.

In Brand, "Pattern Discovery via Entropy Minimization," Technical Report TR98–21, Mitsubishi Electric Research Lab, 1998, an HMM-based framework for dynamics learning is proposed and applied to synthesis of realistic facial animations from a training corpus. The main component of this work is the use of an entropic prior to cope with sparse input data.

Brand's approach has two potential disadvantages. First, it assumes that the resulting dynamic model is time invariant; each state space neighborhood has a unique distribution over state transitions. Second, the use of entropic priors results in fairly "deterministic" models learned from a moderate corpus of training data. In contrast, the diversity of human motion applications require complex models learned from a large corpus of data. In this situation, it is unlikely that a time invariant model will suffice, since different state space trajectories can originate from the same starting point depending upon the class of motion being performed.

Motion Capture for Motion Synthesis

A final category of prior art which is relevant to this invention is the use of motion capture to synthesize human motion with realistic dynamics. Motion capture is by far the most successful commercial technique for creating computer graphics animations of people. In this method, the motion of human actors is captured in digital form using a special suit with either optical or magnetic sensors or targets. This captured motion is edited and used to animate graphical characters.

The motion capture approach has two important limitations. First, the need to wear special clothing in order to track the figure limits the application of this technology to motion which can be staged in a studio setting. This rules out the live, real-time capture of events such as the Olympics, dance performances, or sporting events in which some of the finest examples of human motion actually occur.

The second limitation of current motion capture techniques is that they result in a single prototype of human motion which can only be manipulated in a limited way without destroying its realism. Using this approach, for example, it is not possible to synthesize multiple examples of the same type of motion which differ in a random fashion. The result of motion capture in practice is typically a kind of "wooden", fairly inexpressive motion that is most suited for animating background characters. That is precisely how this technology is currently used in Hollywood movie productions.

There is a clear need for more powerful tracking techniques that can recover human motion under less restrictive conditions. Similarly, there is a need for more powerful generative models of human motion that are both realistic and capable of generating sample motions with natural amounts of "randomness."

SUMMARY OF THE INVENTION

Technologies for analyzing the motion of the human figure play a key role in a broad range of applications, including computer graphics, user-interfaces, surveillance, and video editing. A motion of the figure can be represented as a trajectory in a state space which is defined by the kinematic degrees of freedom of the figure. Each point in state space represents a single configuration or pose of the figure. A motion such as a plié in ballet is described by a trajectory along which the joint angles of the legs and arms change continuously.

A key issue in human motion analysis and synthesis is modeling the dynamics of the figure. While the kinematics of the figure define the state space, the dynamics define which state trajectories are possible (or probable) in that state space. Prior methods for representing human dynamics have been based on analytic dynamic models. Analytic models are specified by a human designer. They are typically second order differential equations relating joint torque, mass, and acceleration.

The field of biomechanics is a source of complex and realistic analytic models of human dynamics. From the biomechanics point of view, the dynamics of the figure are the result of its mass distribution, joint torques produced by the motor control system, and reaction forces resulting from contact with the environment (e.g. the floor). Research efforts in biomechanics, rehabilitation, and sports medicine have resulted in complex, specialized models of human motion. For example, detailed walking models are described in Inman et al., "Human Walking," Williams and Wilkins, 1981.

The biomechanical approach has two drawbacks. First, the dynamics of the figure are quite complex, involving a large number of masses and applied torques, along with reaction forces which are difficult to measure. In principle all of these factors must be modeled or estimated in order to produce physically-valid dynamics. Second, in some applications we may only be interested in a small set of motions, such as a vocabulary of gestures. In the biomechanical approach it may be difficult to reduce the complexity of the model to exploit this restricted focus. Nonetheless, biomechanical models have been applied to human motion analysis.

A prior method for visual tracking uses a biomechanically-derived dynamic model of the upper body. See Wren et al., "Dynamic models of human motion," Proceeding of the Third International Conference on Automatic Face and Gesture Recognition, pages 22–27, Nara, Japan, 1998. The unknown joint torques are estimated along with the state of the arms and head in an input estimation framework. A Hidden Markov Model is trained to represent plausible sequences of input torques. This prior art does not address the problem of modeling reaction forces between the figure and its environment. An example is the reaction force exerted by the floor on the soles of the feet during walking or running.

Therefore, there is a need for inference and learning methods for fully coupled SLDS models that can estimate a complete set of model parameters for a switching model given a training set of time-series data.

Described herein is a new class of approximate learning methods for switching linear dynamic (SLDS) models. These models consist of a set of linear dynamic system (LDS) models and a switching variable that indexes the active model. This new class has three advantages over dynamics learning methods known in the prior art:

New approximate inference techniques lead to tractable learning even when the set of LDS models is fully coupled.

The resulting models can represent time-varying dynamics, making them suitable for a wide range of applications.

All of the model parameters are learned from data, including the plant and noise parameters for the LDS models and Markov model parameters for the switching variable.

In addition, this method can be applied to the problem of learning dynamic models for human motion from data. It has three advantages over analytic dynamic models known in the prior art:

Models can be constructed without a laborious manual process of specifying mass and force distributions. Moreover, it may be easier to tailor a model to a specific class of motion, as long as a sufficient number of samples are available.

The same learning approach can be applied to a wide range of human motions from dancing to facial expressions.

When training data is obtained from analysis of video measurements, the spatial and temporal resolution of the video camera determine the level of detail at which dynamical effects can be observed. Learning techniques can only model structure which is present in the training data. Thus, a learning approach is well-suited to building models at the correct level of resolution for video processing and synthesis.

A wide range of learning algorithms can be cast in the framework of Dynamic Bayesian Networks (DBNs). DBNs generalize two well-known signal modeling tools: Kalman filters for continuous state linear dynamic systems (LDS) and Hidden Markov Models (HMMs) for discrete state sequences. Kalman filters are described in Anderson et al., "Optimal Filtering," Prentice-Hall, Inc., Englewood Cliffs, N.J., 1979. Hidden Markov Models are reviewed in Jelinek, "Statistical methods for speech recognition" MIT Press, Cambridge, Mass., 1998.

Dynamic models learned from sequences of training data can be used to predict future values in a new sequence given the current values. They can be used to synthesize new data sequences that have the same characteristics as the training data. They can be used to classify sequences into different types, depending upon the conditions that produced the data.

We focus on a subclass of DBN models called Switching Linear Dynamics Systems. Intuitively, these models attempt to describe a complex nonlinear dynamic system with a succession of linear models that are indexed by a switching variable. The switching approach has an appealing simplicity and is naturally suited to the case where the dynamics are time-varying.

We present a method for approximate inference in fully coupled switching linear dynamic models (SLDSs). Exponentially hard exact inference is replaced with approximate inference of reduced complexity.

The first preferred embodiment uses Viterbi inference jointly in the switching and linear dynamic system states.

The second preferred embodiment uses variational inference jointly in the switching and linear dynamic system states.

The third preferred embodiment uses general pseudo Bayesian inference jointly in the switching and linear dynamic system states.

Parameters of a fully connected SLDS model are learned from data. Model parameters are estimated using a generalized expectation-maximization (EM) algorithm. Exact expectation/inference (E) step is replaced with one of the three approximate inference embodiments.

The learning method can be used to model the dynamics of human motion. The joint angles of the limbs and pose of the torso are represented as state variables in a switching linear dynamic model. The switching variable identifies a distinct motion regime within a particular type of human motion.

Motion regimes learned from figure motion data correspond to classes of human activity such as running, walking, etc. Inference produces a single sequence of switching modes which best describes a motion trajectory in the figure state space. This sequence segments the figure motion trajectory into motion regimes learned from data.

Accordingly, a method for synthesizing a sequence includes defining a switching linear dynamic system (SLDS) having a plurality of dynamic models, where each model is associated with a switching state such that a model is selected when its associated switching state is true. A state transition record for one or more training sequence of measurements is determined by determining and recording, for a given measurement and for each possible switching state, an optimal prior switching state, based on the training sequences, where the optimal prior switching state optimizes a transition probability. An optimal final switching state is then determined for a final measurement. Next, the sequence of switching states is determined by backtracking through the state transition record, starting from the optimal final switching state. Parameters of the dynamic models are learned in response to the determined sequence of switching states. Finally, a new data sequence is synthesized, based on the dynamic models whose parameters have been learned.

The new data sequence can have characteristics which are similar to characteristics of at least one training sequence. Alternatively, the new data sequence can combine characteristics of plural training sequences which have different characteristics.

In at least one embodiment, the SLDS is modified such that one or more constraints are met. This modification can be accomplished, for example, by adding a continuous state control, such as one or more constraints on continuous states, constraints on the continuous state control, and/or constraints on time. An optimal continuous control can be designed that satisfies the at least one constraint. In the latter case, the new data sequence can be synthesized using the optimal control.

Alternatively, the SLDS modification can be accomplished by adding a switching state control, such as one or more constraints on switching states and/or constraints on the switching state control.

Both optimal switching and continuous state controls can be designed that satisfy continuous and switching constraints respectively.

In various embodiments of the present invention, the sequence of measurements can comprise, but is not limited to, economic data, image data, audio data and/or spatial data.

In one embodiment of the present invention, a SLDS model includes a state transition recorder which determines the state transition record, and which determines the optimal final switching state for a final measurement. A backtracker determines the sequence of switching states corresponding to the training sequence by backtracking, from the optimal final switching state, through the state transition record. A dynamic model learner learns parameters of the dynamic models responsive to the determined sequence of switching states, and a synthesizer synthesizes a new data sequence, based on dynamic models whose parameters have been learned.

While the above embodiments are based on Viterbi techniques, other embodiments of the present invention are based on variational techniques. For example, method for synthesizing a sequence includes defining a switching linear dynamic system (SLDS) having a plurality of dynamic models. Each dynamic model is associated with a switching state such that a dynamic model is selected when its associated switching state is true. The switching state at a particular instance is determined by a switching model, such as a hidden Markov model (HMM). The dynamic models are decoupled from the switching model, and parameters of the decoupled dynamic model are determined responsive to a switching state probability estimate. A state of a decoupled dynamic model corresponding to a measurement at the particular instance is estimated, responsive to one or more training sequences. Parameters of the decoupled switching model are then determined, responsive to the dynamic state estimate. A probability is estimated for each possible switching state of the decoupled switching model. The sequence of switching states is determined based on the estimated switching state probabilities. Parameters of the dynamic models are learned responsive to the determined sequence of switching states. Finally, a new data sequence is synthesized based on the dynamic models with learned parameters.

A switching linear dynamic system (SLDS) model based on variational techniques includes an approximate variational state sequence inference module, which reestimates parameters of each SLDS model, using variational inference, to minimize a modeling cost of current state sequence estimates, responsive to one or more training measurement sequences. A dynamic model learner learns parameters of the dynamic models responsive to the determined sequence of switching states, and a synthesizer synthesizes a new data sequence, based on the dynamic models with learned parameters.

Another embodiment of the present invention comprises a method for interpolating from a measurement sequence, and includes defining a SLDS having a plurality of dynamic models. Each model is associated with a switching state such that a model is selected when its associated switching state is true. A state transition record is determined by determining and recording, for a given measurement and for each possible switching state, an optimal prior switching state, based on the measurement sequence, where the optimal prior switching state optimizes a transition probability. An optimal final switching state is determined for a final measurement. The sequence of switching states is determined by backtracking through the state transition record from said optimal final switching state. The sequence of continuous states is determined based on the determined sequence of switching states. Finally, missing motion data is interpolated from an input sequence, such as a sparsely observed image sequence, based on the dynamic models and the determined sequences of continuous and switching states.

In another embodiment, a receiver interpolates missing frames from transmitted model parameters and from received key frames, the key frames having been determined based on the learned parameters, using either Viterbi or variational techniques.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Switching Linear Dynamic System Model

Figure 1:
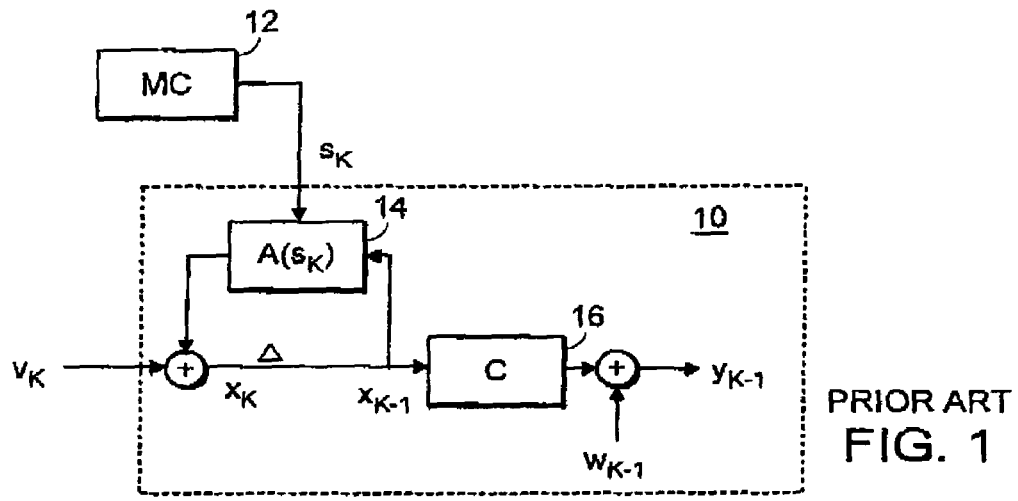
FIG. 1 is a block diagram of a linear dynamical system, driven by white noise, whose state parameters are switched by a Markov chain model.

FIG. 1 is a block diagram of a complex physical linear dynamic system (LDS) 10, driven by white noise $v_k$, also called "plant noise." The LDS state parameters evolve in time according to some known model, such as a Markov chain (MC) model 12.

The system can be described using the following set of state-space equations:

$$x_{t+1} = A(s_{t+1})x_t + v_{t+1}(s_{t+1}),$$

$$y_t = Cx_t + w_t, \text{ and}$$

$$x_0 = v_0(s_0) \quad \text{(Eq. 1)}.$$

for the physical system 10, and $$Pr(s_{t+1}|s_t) = s'_{t+1} \Pi s_t, \text{ and}$$

$$Pr(s_0) = \pi_0$$

for the switching model 12.

Here, $x_t \in \Re^N$ denotes the hidden state of the LDS 10 at time t, and $v_t$ is the state noise process. Similarly, $y_t \in \Re^M$ is the observed measurement at time t, and $w_t$ is the measurement noise. Parameters A and C are the typical LDS parameters: the state transition matrix 14 and the observation matrix 16, respectively. Assuming the LDS models a Gauss-Markov process, the noise processes are independently distributed Gaussian:

$$v_t(s_t) \sim N(0, Q(s_t)), t > 0$$

$$v_0(s_0) \sim N(x_0(s_0), Q_0(s_0))$$

$$w_t \sim N(0, R).$$

where Q is the state noise variance and R is the measurement noise variance. The notation s' is used to indicate the transpose of vector s.

The switching model 12 is assumed to be a discrete first-order Markov process. State variables of this model are written as $s_t$. They belong to the set of S discrete symbols $\{e_0, \ldots, e_{s-1}\}$, where $e_i$ is, for example, the unit vector of dimension S with a non-zero element in the i-th position. The switching model 12 is a first-order discrete Markov model defined with the state transition matrix $\Pi$ whose elements are $$\Pi(i,j) = Pr(s_{t+1} = e_i | s_t = e_j), \quad \text{(Eq. 2)}.$$

and which is given an initial state distribution $\Pi_0$.

Coupling between the LDS and the switching process is full and stems from the dependency of the LDS parameters A and Q on the switching process state $s_t$. Namely, $$A(s_t = e_i) = A_i$$

$$Q(s_t = e_i) = Q_i$$

In other words, switching state $s_t$ determines which of S possible models $\{(A_0, Q_0), \ldots, (A_{S-1}, Q_{S-1})\}$ is used at time t.

Figure 2:
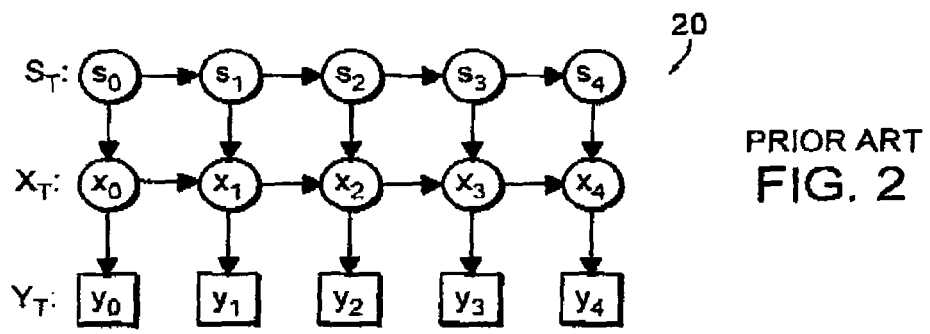
FIG. 2 is a dependency graph illustrating a fully coupled Bayesian network representation of the SLDS of FIG. 1.

FIG. 2 is a dependency graph 20 equivalently illustrating a rather simple but fully coupled Bayesian network representation of the SLDS, where each $s_t$ denotes an instance of one of the discrete valued action states which switch the physical system models having continuous valued states x and producing observations y. The full model can be written as the "joint distribution" P:

$$P(Y_T, X_T, S_T) =$$

$$Pr(s_0) \prod_{t=1}^{T-1} Pr(s_t | s_{t-1}) Pr(x_0 | s_0) \prod_{t=1}^{T-1} Pr(x_t | x_{t-1}, s_t) \prod_{t=0}^{T-1} Pr(y_t | x_t).$$

where $Y_T$, $X_T$, and $S_T$ denote the sequences, of length T, of observation and hidden state variables, and switching variables, respectively. For example, $Y_T = \{y_0, \ldots, y_{T-1}\}$. In this dependency graph 20, the coupling between the switching states and the LDS states is full, i.e., switching states are time-dependent, LDS states are time-dependent, and switching and LDS states are intradependent.

We can now write an equivalent representation of the fully coupled SLDS as the above DBN, assuming that the necessary conditional probability distribution functions (pdfs) are appropriately defined. Assuming a Gauss-Markov process on the LDS, it follows:

$$x_{t+1} | x_t, s_{t+1} = e_i \sim N(A_i x_t, Q_i),$$

$$y_t | x_t \sim N(Cx_t, R),$$

$$x_0 | s_0 = e_i \sim N(x_{0,i}, Q_{0,i})$$

Recalling the Markov switching model assumption, the joint pdf of the complex DBN of duration T, or, equivalently, its Hamiltonian, where the Hamiltonian H(x) of a distribution P(x) is defined as any positive function such that $P(x) = [(\exp(-H(x)))/(\Sigma_\psi \exp(-H(\psi)))]$, can be written as:

$$H(X_T, S_T, Y_T) = \quad \text{(Eq. 3)}$$

$$\frac{1}{2} \sum_{i=1}^{T-1} \sum_{i=0}^{N-1} [(x_i - A_i x_{i-1})' Q_i^{-1} (x_i - A_i x_{i-1}) + \log|Q_i|] s_i(i) +$$

$$\frac{1}{2} \sum_{i=0}^{N-1} [(x_{0,i})' Q_{0,i}^{-1} (x_{0,1}) + \log|Q_{0,i}|] s_0(i) + \frac{NT}{2} \log 2\pi +$$

$$\frac{1}{2} \sum_{i=0}^{T-1} (y_i - Cx_i)' R^{-1} (y_i - Cx_i) + \frac{T}{2} \log|R| +$$

$$\frac{MT}{2} \log 2\pi + \sum_{i=1}^{T-1} s'_i (-\log \prod) s_{i-1} + s'_0 (-\log \pi_0).$$

Inference

The goal of inference in SLDSs is to estimate the posterior probability of the hidden states of the system ($s_t$ and $x_t$) given some known sequence of observations $Y_T$ and the known model parameters, i.e., the likelihood of a sequence of models as well as the estimates of states. Namely, we need to find the posterior $$P(X_T, S_T | Y_T) = Pr(X_T, S_T | Y_T),$$

or, equivalently, its "sufficient statistics". Given the form of P it is easy to show that these are the first and second-order statistics: mean and covariance among hidden states $$x_t, x_{t-1}, s_t, s_{t-1}.$$

If there were no switching dynamics, the inference would be straightforward—we could infer $X_T$ from $Y_T$ using an LDS inference approach such as smoothing, as described by Rauch, "Solutions to the linear smoothing problem," IEEE Trans. Automatic Control, AC-8 (4):371–372, October 1963. However, the presence of switching dynamics embedded in matrix P makes exact inference more complicated. To see that, assume that the initial distribution of $x_0$ at t=0 is Gaussian. At t=1, the pdf of the physical system state $x_1$ becomes a mixture of S Gaussian pdfs since we need to marginalize over S possible but unknown models. At time t, we will have a mixture of $S^t$ Gaussians, which is clearly intractable for even moderate sequence lengths. It is therefore necessary to explore approximate inference techniques that will result in a tractable learning method. What follows are three preferred embodiments of the inference step.

Approximate Viterbi Inference Embodiment

Figure 3:
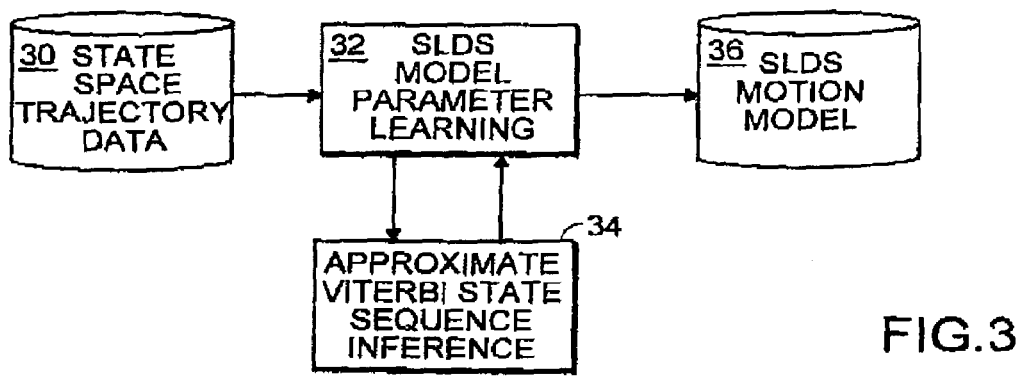
FIG. 3 is a block diagram of an embodiment of the present invention based on approximate Viterbi inference.

FIG. 3 is a block diagram of an embodiment of a dynamics learning method based on approximate Viterbi inference. At step 32, switching dynamics of a number of SLDS motion models are learned from a corpus of state space motion examples 30. Parameters 36 of each SLDS are re-estimated, at step 34, iteratively so as to minimize the modeling cost of current state sequence estimates, obtained using the approximate Viterbi inference procedure. Approximate Viterbi inference is developed as an alternative to computationally expensive exact state sequence estimation.

The task of the Viterbi approximation approach of the present invention is to find the most likely sequence of switching states $s_t$ for a given observation sequence $Y_T$. If the best sequence of switching states is denoted $S^*_T$, then the desired posterior $P(X_T, S_T|Y_T)$ can be approximated as $$P(X_T, S_T|Y_T) = P(X_T|S_T, Y_T) P(S_T|Y_T) \approx P(X_T|S_T, Y_T)\delta(S_T - S^*_T), \quad (\text{Eq 4})$$

where $\delta(x)=1$ if $x=0$ and $\delta(x)=0$ if $x \neq 0$. In other words, the switching sequence posterior $P(S_T|Y_T)$ is approximated by its mode. Applying Viterbi inference to two simpler classes of models, discrete state hidden Markov models and continuous state Gauss-Markov models is well-known. An embodiment of the present invention utilizes an algorithm for approximate Viterbi inference that generalizes the two approaches.

We would like to determine the switching sequence $S^*_T$ such that $S^*_T = \arg\max_{S_T} P(S_T|Y_T)$. First, define the following probability $J_{t,i}$ up to time t of the switching state sequence being in state i at time t given the measurement sequence $Y_t$:

$$J_{t,i} = \max_{S_{t-1}} P(S_{t-1}, s_t = e_i, Y_t) \quad (\text{Eq. 5})$$

If this quantity is known at time T, the probability of the most likely switching sequence $S^*_T$ is simply $P(S^*_T|Y_T) \propto \max_i J_{T-1,i}$. In fact, a recursive procedure can be used to obtain the desired quantity. To see that, express $J_{t,i}$ in terms of $J_s$ at t−1. It follows that $$J_{t,i} = \max_{S_{t-1}} P(S_{t-1}, s_t = e_i, Y_t) \quad (\text{Eq. 6})$$

$$= \max_{S_{t-1}} P(S_{t-1}, s_t = e_i, Y_{t-1}, y_t)$$

$$= \max_{S_{t-1}} P(y_t | S_{t-1}, s_t = e_i, Y_{t-1}) P(s_t = e_i | S_{t-1}, Y_{t-1}) P(S_{t-1}, Y_{t-1})$$

$$\approx \max_j \{P(y_t | s_t = e_i, s_{t-1} = e_j, S^*_{t-2}(j), Y_{t-1}) P(s_t = e_i | s_{t-1} = e_j) \max_{S_{t-2}} P(S_{t-2}, s_{t-1} = e_j, Y_{t-1})\}$$

$$= \max_j \{J_{t|t-1,i,j} J_{t-1,j}\}$$

where we denote $$J_{t|t-1,i,j} = P(y_t|s_t=e_i, s_{t-1}=e_j, S^*_{t-2}(j), Y_{t-1}) P(s_t=e_i|s_{t-1}=e_j) \quad (\text{Eq. 7}).$$

as the "transition probability" from state j at time t−1 to state i at time t. Since this analysis takes place relative to time t, we refer to $s_t$ as the "switching state," and to $s_{t-1}$ as the "previous switching state." $S^*_{t-2}(i)$ is the "best" switching sequence up to time t−1 when SLDS is in state i at time t−1:

$$S^*_{t-2}(i) = \arg\max_{S_{t-2}} J_{t-1,i}. \quad (\text{Eq. 8})$$

Hence, the switching sequence posterior at time t can be recursively computed from the same at time t−1. The two scaling components in $J_{t|t-1,i,j}$ are the likelihood associated with the transition j→i from t−1 to t, and the probability of discrete SLDS switching from j to i.

To find the likelihood term, note that concurrently with the recursion of Equation 6, for each pair of consecutive switching states j,i at times t−1, one can obtain the following statistics using the Kalman filter:

$$[[\hat{x}_{t|t,i}]]\hat{x}_{t|t,i} \triangleq \langle x_t|Y_t, s_T = e_i\rangle$$

$$\sum_{T|T,i} \triangleq \langle (x_t - \hat{x}_{t|t,i})(x_T - \hat{x}_{t|t,i})'|Y_t, s_t = e_i\rangle$$

$$\hat{x}_{t|t-1,i,j} \triangleq \langle x_t | Y_{t-1}, s_t = e_i, s_{t-1} = e_j\rangle$$

$$\sum_{t|t-1,i,j} \triangleq \langle (x_t - \hat{x}_{t|t,i,j})(x_{t-1} - \hat{x}_{t|t-1,i,j})' | Y_t, s_t = e_i, s_{t-1} = e_j\rangle$$

$$\hat{x}_{t|t,i,j} \triangleq \langle x_t | Y_t, s_t = e_i, s_{t-1} = e_j\rangle$$

$$\sum_{t|t,i,j} \triangleq \langle (x_t - \hat{x}_{t|t,i})(x_t - \hat{x}_{t|t,i})' | Y_t, s_t = e_i, s_{t-1} = e_j\rangle$$

where $\hat{x}_{t|t,i}$ is the "best" filtered LDS state estimate at t when the switch is in state i at time t and a sequence of t measurements, $Y_t$, has been processed; $\hat{x}_{t|t-1,i,j}$ and $\hat{x}_{t|t,i,j}$ are the one-step predicted LDS state and the "best" filtered state estimates at time t, respectively, given that the switch is in state i at time t and in state j at time t−1 and only t−1 measurements are known. The two sets $\{\hat{x}_{t|t-1,i,j}\}$ and $\{\hat{x}_{t|t,i,j}\}$, where i and j take on all possible values, are examples of "sets of continuous state estimates." The set $\{\hat{x}_{t|t-1,i,j}\}$ is obtained through "Viterbi prediction." Similar definitions are easily obtained for filtered and predicted state variance estimates, $\Sigma_{t|t,i}$ and $\Sigma_{t|t-1,i,j}$ respectively. For a given switch state transitions j→i it is now easy to establish relationship between the filtered and the predicted estimates. From the theory of Kalman estimation, it follows that for transition j→i the following time updates hold:

$$\hat{x}_{t|t-1,i,j} = A_i \hat{x}_{t-1|t-1,j} \quad \text{(Eq. 9).}$$

$$\Sigma_{t|t-1,i,j} = A_i \Sigma_{t-1|t-1,j} A_i' + Q_i \quad \text{(Eq. 10).}$$

Given a new observation $y_t$ at time t, each of these predicted estimates can now be filtered using a Kalman "measurement update" framework. For instance, the state estimate measurement update equation yields $$\hat{x}_{t|t,i,j} = \hat{x}_{t|t-1,i,j} + K_{i,j}(y_t - C\hat{x}_{t|t-1,i,j}). \quad \text{(Eq. 11)}$$

where $K_{i,j}$ is the Kalman gain matrix associated with the transition j→i.

Appropriate equations can be obtained that link $\Sigma_{t|t-1,i,j}$ and $\Sigma_{t|t,i,j}$. The likelihood term can then be easily computed as the probability of innovation $y_t - C\hat{x}_{t|t-1,i,j}$ of j→i transition, $$y_t|s_t = e_i, s_{t-1} = e_j, S^*_{t-2}(j) \sim N(y_t; C\hat{x}_{t|t-1,i,j}, C\Sigma_{t|t-1,i,j}C' + R) \quad \text{(Eq. 12).}$$

Obviously, for every current switching state i there are S possible previous switching states. To maximize the overall probability at every time step and for every switching state, one "best" previous state j is selected:

$$\psi_{t-1,i} = \arg\max_j \{J_{t-1,i,j} J_{t-1,j}\} \quad \text{(Eq. 13).}$$

Since the best state is selected based on the continuous state predictions from the previous time step, $\psi_{t-1,i}$ is referred to as the "optimal prior switching state." The index of this state is kept in the state transition record entry $\psi_{t-1,i}$. Consequently, we now obtain a set of S best filtered LDS states and variances at time t:

$$\hat{x}_{t|t,i} = \hat{x}_{t|t,i,\psi_{t-1,i}} \text{ and } \Sigma_{t|t,i} = \Sigma_{t|t,i,\psi_{t-1,i}}.$$

Once all T observations $Y_{T-1}$ have been fused to decode the "best" switching state sequence, one uses the index of the best final state, $$i^*_{T-1} = \arg\max_j J_{T-1,i},$$

and then traces back through the state transition record $\psi_{t-1,i}$, setting $i^*_t = \psi_{t,i^*_{t+1}}$. The switching model's sufficient statistics are now simply $\langle s_t \rangle = e_{i^*_t}$ and $\langle s_t s'_{t-1} \rangle = e_{i^*_t} e_{i^*_{t-1}}'$. Given the "best" switching state sequence, the sufficient LDS statistics can be easily obtained using Rauch-Tung-Streiber (RTS) smoothing. Smoothing is described in Anderson et al, "Optimal Filtering," Prentice-Hall, Inc., Englewood Cliffs, N.J., 1979. For example, $$\langle x_t, s_t(i) \rangle \begin{cases} \hat{x}_{t|T-1,i^*_j} & i = i^*_t \\ 0 & \text{otherwise} \end{cases}$$

for i=0, . . . , S-1.

Figure 4A:
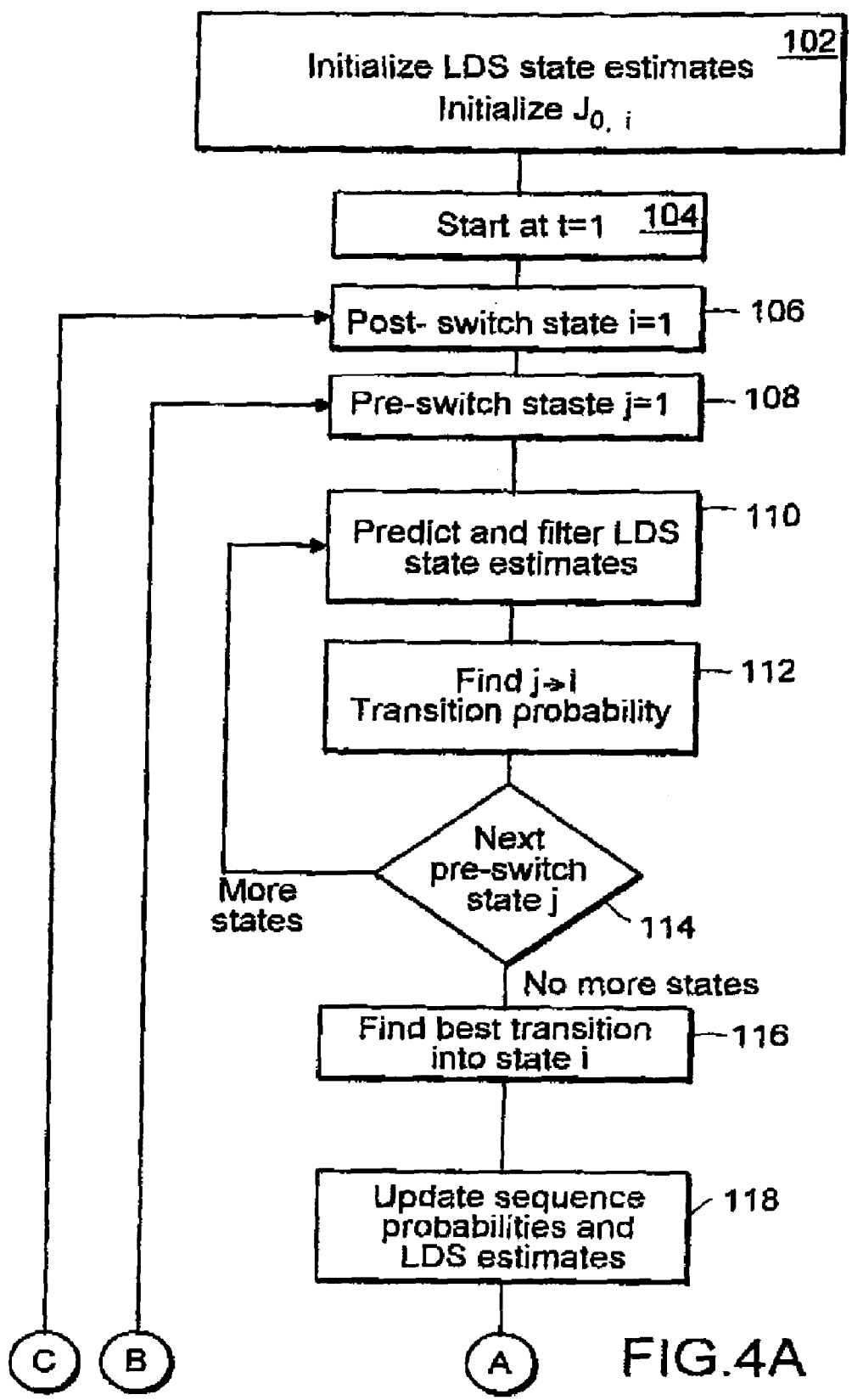
FIGS. 4A and 4B comprise a flowchart illustrating the steps performed by the embodiment of FIG. 3.
Figure 4B:
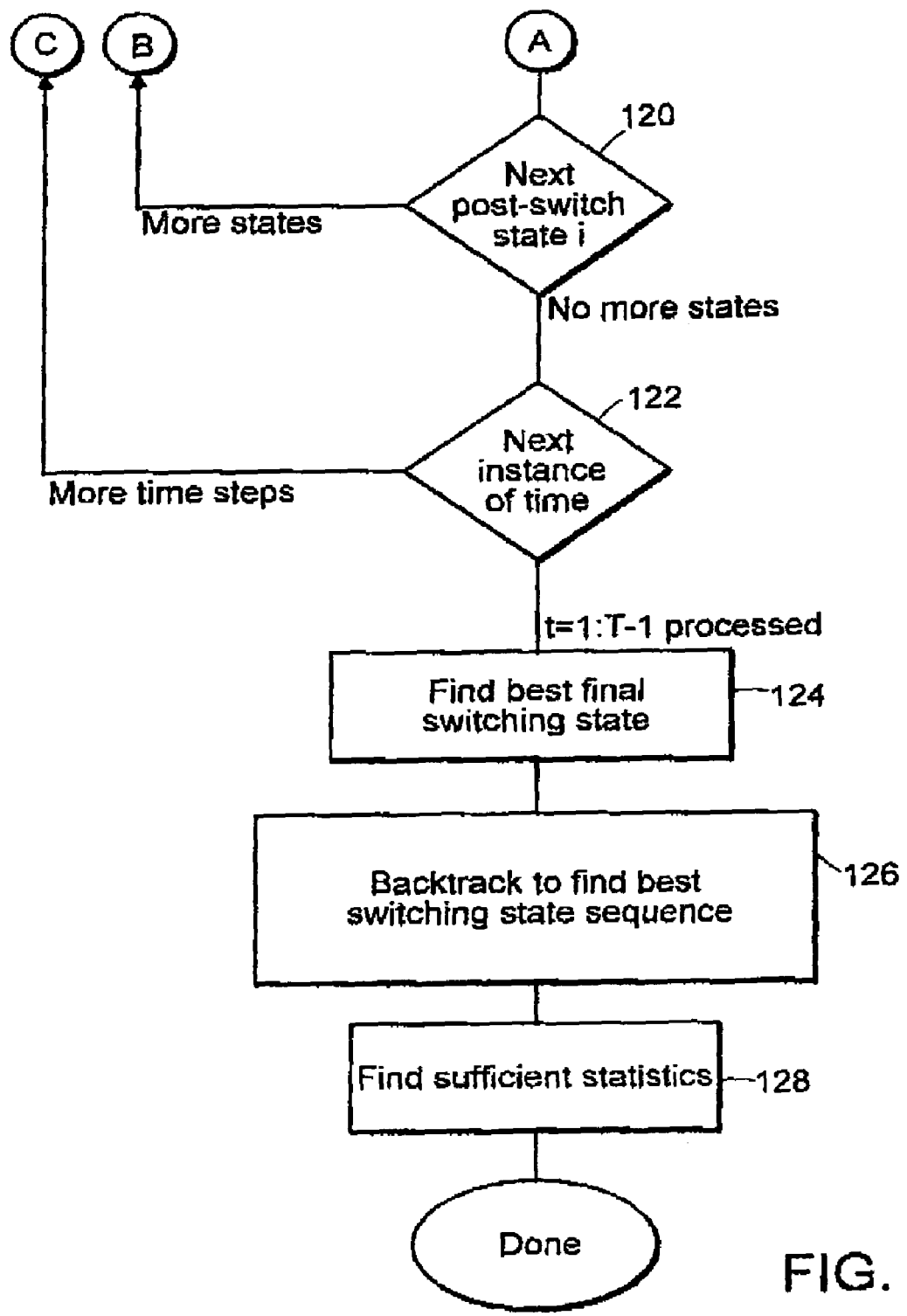

FIGS. 4A and 4B comprise a flowchart that summarizes an embodiment of the present invention employing the Viterbi inference algorithm for SLDSs, as described above. The steps are as follows:

Initialize LDS state estimates $\hat{x}_{0|-1,i}$ and $\Sigma_{0|-1,i}$; (Step 102)
Initialize $J_{0,i}$. (Step 102)
for j=1:S (Steps 108, 114)
    Predict and filter LDS state estimates $\hat{x}_{t|t,i,j}$ and $\Sigma_{t|t,i,j}$ (Step 110)
    Find j→i "transition probability" $J_{t|t-1,i,j}$
end (Step 112)
Find best transition $J_{t,i}$, into state i; (Step 116)
Update sequence probabilities $J_{t,i}$ and LDS state estimates $\hat{x}_{t|t,i}$ and $\Sigma_{t|t,i}$ (Step 118)
end
Find "best" final switching state $i^*_{T-1}$ (Step 124)
Backtrack to find "best" switching state sequence $i^*_t$ (Step 126)
Find DBN's sufficient statistics. (Step 128)

Approximate Variational Inference Embodiment

Figure 5:
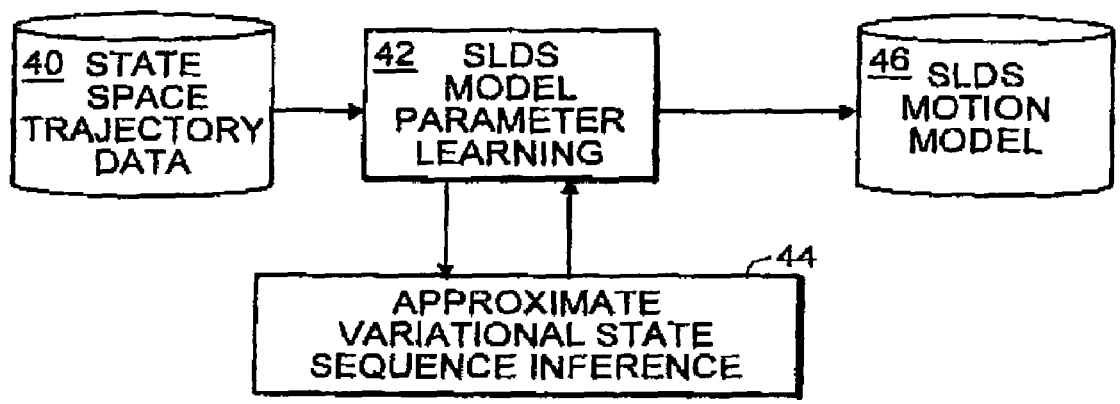
FIG. 5 is a block diagram of an embodiment of the present invention based on approximate variational inference.

FIG. 5 is a block diagram for an embodiment of the dynamics learning method based on approximate variational inference. Generally, reference numbers 40–46 correspond to reference numbers 30–36 of FIG. 3, the approximate Viterbi inference block 34 of FIG. 3 being replaced by the approximate variational inference block 44.

At step 42, the switching dynamics of one or more SLDS motion models are learned from a corpus of state space motion examples 40. Parameters 46 of each SLDS are re-estimated, at step 44, iteratively so as to minimize the modeling cost of current state sequence estimates that are obtained using the approximate variational inference procedure. Approximate variational inference is developed as an alternative to computationally expensive exact state sequence estimation.

A general structured variational inference technique for Bayesian networks is described in Jordan at al., "An Introduction to Variational Methods For Graphical Models," Learning In Graphical Models, Kluwer Academic Publishers, 1998. They consider a parameterized distribution Q which is in some sense close to the desired conditional distribution P, but which is easier to compute. Q can then be employed as an approximation of P, $$P(X_T, S_T|Y_T) \approx Q(X_T, S_T|Y_T)$$

Namely, for a given set of observations $Y_T$, a distribution $Q(X_T, S_T|\eta, Y_T)$ with an additional set of variational parameters h is defined such that Kullback-Leibler divergence between $Q(X_T, S_T|\eta, Y_T)$ and $P(X_T, S_T|Y_T)$ is minimized with respect to h:

$$\eta^* = \arg\min_\eta \sum_{S_T} \int_{X_T} Q(X_T, S_T|\eta, Y_T) \log \frac{P(X_T, S_T|Y_T)}{Q(X_T, S_T|\eta, Y_T)}.$$

The dependency structure of Q is chosen such that it closely resembles the dependency structure of the original distribution P. However, unlike P, the dependency structure of Q must allow a computationally efficient inference. In our case, we define Q by decoupling the switching and LDS portions of SLDS as shown in FIG. 6.

Figure 6:
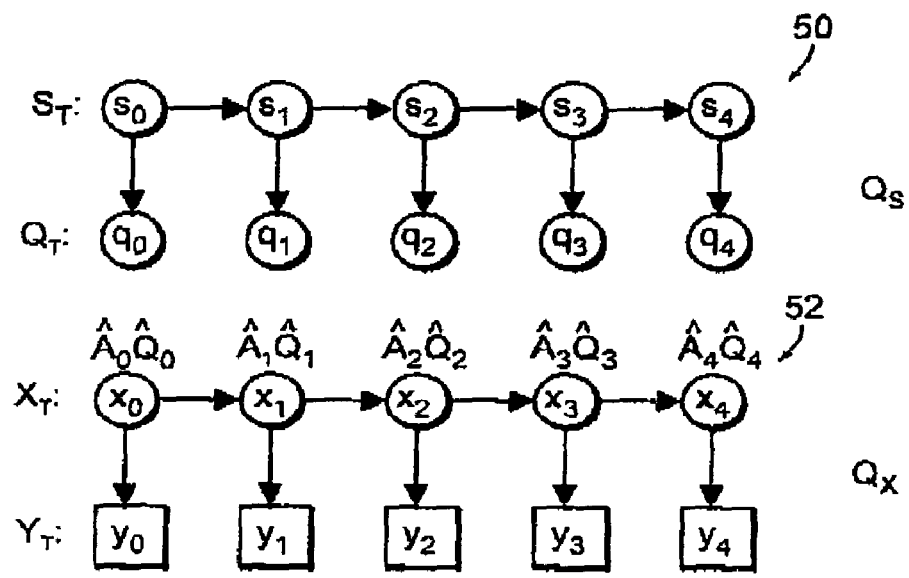
FIG. 6 is a dependency graph illustrating the decoupling of the hidden Markov model and SLDS in the embodiment of FIG. 5.

FIG. 6 illustrates the factorization of the original SLDS. The two subgraphs of the original network are a Hidden Markov Model (HMM) $Q_s$ 50 with variational parameters $\{q_0, \ldots, q_{T-1}\}$, and a time-varying LDS. $Q_x$ 52 with variational parameters $\{\hat{x}_0, \hat{A}_0, \ldots, \hat{A}_{T-1}, Q_0, \ldots, Q_{T-1}\}$. More precisely, the Hamiltonian of the approximating dependency graph is defined as:

$$H_Q(X_T, S_T, Y_T) = \frac{1}{2}\sum_{t=1}^{T-1}(x_t - \hat{A}_t x_{t-1})' \hat{Q}_t^{-1}(x_t - \hat{A}_t x_{t-1}) + \quad \text{(Eq. 14)}$$

$$\frac{1}{2}\log|\hat{Q}_t| + \frac{1}{2}(x_0 - \hat{x}_0)' \hat{Q}_0^{-1}(x_0 - \hat{x}_0) + \frac{1}{2}\log|\hat{Q}_0| +$$

$$\frac{NT}{2}\log 2\pi + \frac{1}{2}\sum_{t=0}^{T-1}(y_t - Cx_t)' R^{-1}(y_t - Cx_t) + \frac{T}{2}\log|R| +$$

$$\frac{MT}{2}\log 2\pi + \sum_{t=1}^{T-1} s_t'(-\log\Pi)s_{t-1} + s_0'(-\log\pi_0) + \sum_{t=1}^{T-1} s_t'(-\log q_t).$$

The two subgraphs 50, 52 are "decoupled," thus allowing for independent inference, $Q(X_T, S_T|\eta, Y_T) = Q(X_T|\eta, Y_T) Q_s(S_T|\eta)$. This is also reflected in the sufficient statistics of the posterior defined by the approximating network, e.g., $\langle x_t x_t' s_t \rangle = x_t x_t' \langle \rangle \langle s_t \rangle$.

The optimal values of the variational parameters h are obtained by setting the derivative of the KL-divergence with respect to h to zero. We can then arrive at the following optimal variational parameters:

$$\hat{Q}_{T-1}^{-1} = \sum_{i=0}^{S-1} Q_i^{-1} \langle s_t(i) \rangle \quad \text{(Eq. 15)}$$

$$\hat{Q}_t^{-1} = \sum_{i=0}^{S-1} Q_i^{-1} \langle s_t(i) \rangle + \sum_{i=0}^{S-1} A_i' Q_i^{-1} \langle s_{t+1}(i) \rangle -$$

$$\hat{A}_{t+1}' \hat{Q}_{t+1}^{-1} \hat{A}_{t+1}, \; 0 < t < T-1$$

$$\hat{Q}_0^{-1} = \sum_{i=0}^{S-1} Q_{0,i}^{-1} \langle s_0(i) \rangle + \sum_{i=0}^{S-1} A_i' Q_i^{-1} A_i \langle s_1(i) \rangle - \hat{A}_1' \hat{Q}_1^{-1} \hat{A}_1$$

$$\hat{A}_t = \hat{Q}_t \sum_{i=0}^{S-1} Q_i^{-1} A_i \langle s_t(i) \rangle$$

$$\hat{x}_0 = \hat{Q}_0 \sum_{i=0}^{S-1} Q_{0,i}^{-1} x_{0,i} \langle S_0(i) \rangle$$

$$\log q_0(i) = -\frac{1}{2}\langle (x_0 - x_{0,i})' \hat{Q}_{0,i}^{-1} (x_0 - x_{0,i}) \rangle - \frac{1}{2}\log|\hat{Q}_{0,i}| \quad \text{(Eq. 16)}$$

$$\log q_t(i) = -\frac{1}{2}\langle (x_t - A_i x_{t-1})' \hat{Q}_i^{-1} (x_t - A_i x_{t-1}) \rangle - \frac{1}{2}\log|Q_{t,i}|, \; t > 0$$

To obtain the expectation terms $\langle s_t \rangle = \Pr(s_t|q_0, \ldots q_{T-1})$, we use the inference in the HMM with output "probabilities" $q_t$, as described in Rabiner and Juang, "Fundamentals of Speech Recognition," Prentice Hall, 1993. Similarly, to obtain $\langle x_t \rangle = E[x_t|U_T]$, LDS inference is performed in the decoupled time-varying LDS via RTS smoothing. Since $\hat{A}_t$, $Q_t$ in the decoupled LDS $Q_x$ depend on $\langle s_t \rangle$ from the decoupled HMM $Q_s$, and $q_t$ depends on $\langle x_t \rangle$, $\langle x_t x_t' \rangle$, $\langle x_t x_{t-1}' \rangle$ from the decoupled LDS, Equations 15 and 16 together with the inference solutions in the decoupled models form a set of fixed-point equations. Solution of this fixed-point set yields a tractable approximation to the intractable inference of the original fully coupled SLDS.

Figure 7:
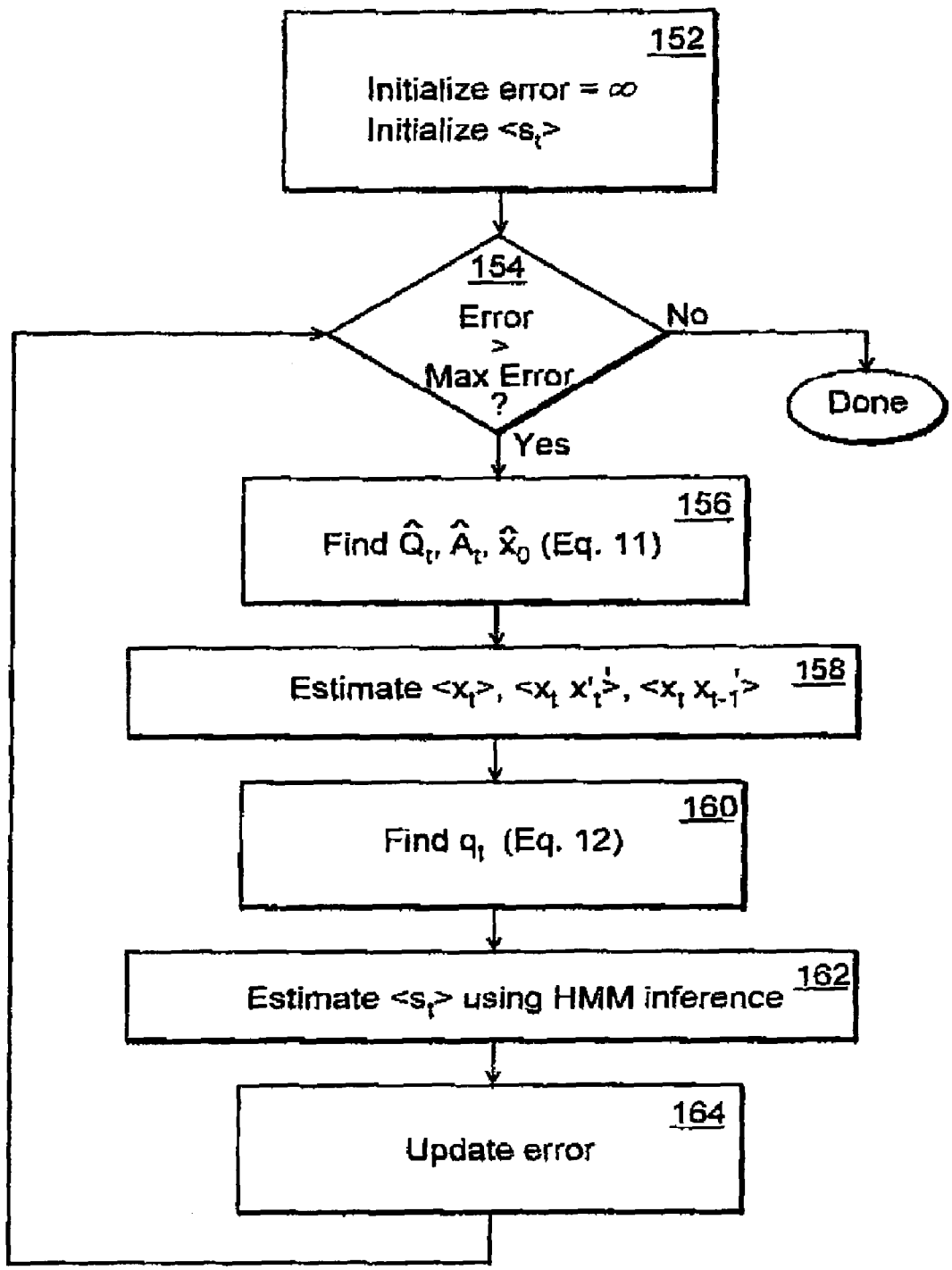
FIG. 7 is a flowchart illustrating the steps performed by the embodiment of FIG. 5.

FIG. 7 is a flowchart summarizing the variational inference algorithm for fully coupled SLDSs, corresponding to the steps below:
error=∞; (Step 152)
Initialize $\langle s_t \rangle$; (Step 152)
while (error>maxError) { (Step 154)

Find $Q_t$, $\hat{A}_t$, $\hat{x}_0$ from $\langle s_t \rangle$ using Equations 11; (Step 156)
Estimate $\langle x_t \rangle$, $\langle x_t x_t' \rangle$ and $\langle x_t x_{t-1}' \rangle$ from $Y_T$ using time-varying LDS inference; (Step 158)
Find $q_t$ from $\langle x_t \rangle$, $\langle x_t x_t' \rangle$ and $\langle x_t x_{t-1}' \rangle$ using Equations 12; (Step 160)
Estimate $\langle s_t \rangle$ from $q_t$ using HMM inference; (Step 162)
Update approximation error (KL divergence); (Step 164)
}

Variational parameters in Equations 15 and 16 have an intuitive interpretation. Variational parameters of the decoupled LDS $Q_t$ and $\hat{A}_t$ in Equation 15 define a best unimodal (non-switching) representation of the corresponding switching system and are, approximately, averages of the original parameters weighted by a best estimates of the switching states P(s). Variational parameters of the decoupled HMM log $q_t(i)$ in Equation 16 measure the agreement of each individual LDS with the data.

General Pseudo Bayesian Inference Embodiment

The Generalized Pseudo Bayesian (GPB) approximation scheme first introduced in Bar-Shalom et al., "Estimation and Tracking: Principles, Techniques, and Software," Artech House, Inc. 1993 and in Kim, "Dynamic Linear Models With Markov-Switching," Journal of Econometrics, volume 60, pages 1–22, 1994, is based on the idea of "collapsing", i.e., representing a mixture of $M^t$ Gaussians with a mixture of $M^r$ Gaussians, where r<t. A detailed review of a family of similar schemes appears in Kevin P. Murphy, "Switching Kalman Filters," Technical Report 98-10, Compaq Cambridge Research Lab, 1998. We develop a SLDS inference scheme jointly in the switching and linear dynamic system states, derived from filtering GPB2 approach of Bar-Shalom et al. The algorithm maintains a mixture of $M^2$ Gaussians over all times.

GPB2 is closely related to the Viterbi approximation described previously. It differs in that instead of picking the most likely previous switching state j at every time step t and switching state i, we collapse the M Gaussians (one for each possible value of j) into a single Gaussian.

Consider the filtered and predicted means $\hat{x}_{t|t,i,j}$ and $\hat{x}_{t|t-1,i,j}$, and their associated covariances, which were defined previously with respect to the approximate Viterbi embodiment. Assume that for each switching state i and pairs of states (i,j) the following distributions are defined at each time step:

$Pr(s_t = i|Y_t)$ $Pr(s_t = i, s_{t-1} = j|Y_t)$

Regular Kalman filtering update can be used to fuse the new measurement $y_t$ and obtain $S^2$ new SLDS states at t for each S states at time t−1, in a similar fashion to the Viterbi approximation embodiment discussed previously.

Unlike Viterbi approximation which picks one best switching transition for each state i at time t, GPB2 "averages" over S possible transitions from t−1. Namely, it is easy to see that $Pr(s_t = i, s_{t-1} = j|Y_t) \approx Pr(y_t|\hat{x}_{t,i,j}) \Pi(i,j) Pr(s_{t-1} = j|Y_{t-1}).$ From there it follows immediately that the current distribution over the switching states is $$Pr(s_t = i \mid Y_t) = \sum_j Pr(s_t = i, s_{t-1} = j \mid Y_t)$$

and that each previous state j now has the following posterior $$Pr(s_{t-1} = j \mid s_t = i, Y_t) = \frac{Pr(s_t = i, s_{t-1} = j \mid Y_t)}{Pr(s_t = i \mid Y_t)}.$$

This posterior is important because it allows one to "collapse" or "average" the S transitions into each state i into one average state, e.g.

$$\hat{x}_{t|t,i} = \sum_j \hat{x}_{t|t,i,j} Pr(s_{t-1} = j \mid s_t = i, Y_t).$$

Analogous expressions can be obtained for the variances $S_{t|t,i}$ and $S_{t,t-1|t,i}$.

Smoothing in GPB2 is a more involved process that includes several additional approximations. Details can be found in Kevin P. Murphy, "Switching Kalman Filters," Technical Report 98-10, Compaq Cambridge Research Lab, 1998. First an assumption is made that decouples the switching model from the LDS when smoothing the switching states. Smoothed switching states are obtained directly from $Pr(s_t|Y_t)$ estimates, namely $Pr(s_t=i|s_{t+1}=k, Y_T) \approx Pr(s_t=i|s_{t+1}=k, Y_t)$. Additionally, it is assumed that $\hat{x}_{t+1|T,i,k} \approx \hat{x}_{t+1|T,k}$. These two assumptions lead to a set of smoothing equations for each transition (i,k) from t to t+1 that obey an RTS smoother, followed by collapsing similar to the filtering step.

Figure 8A:
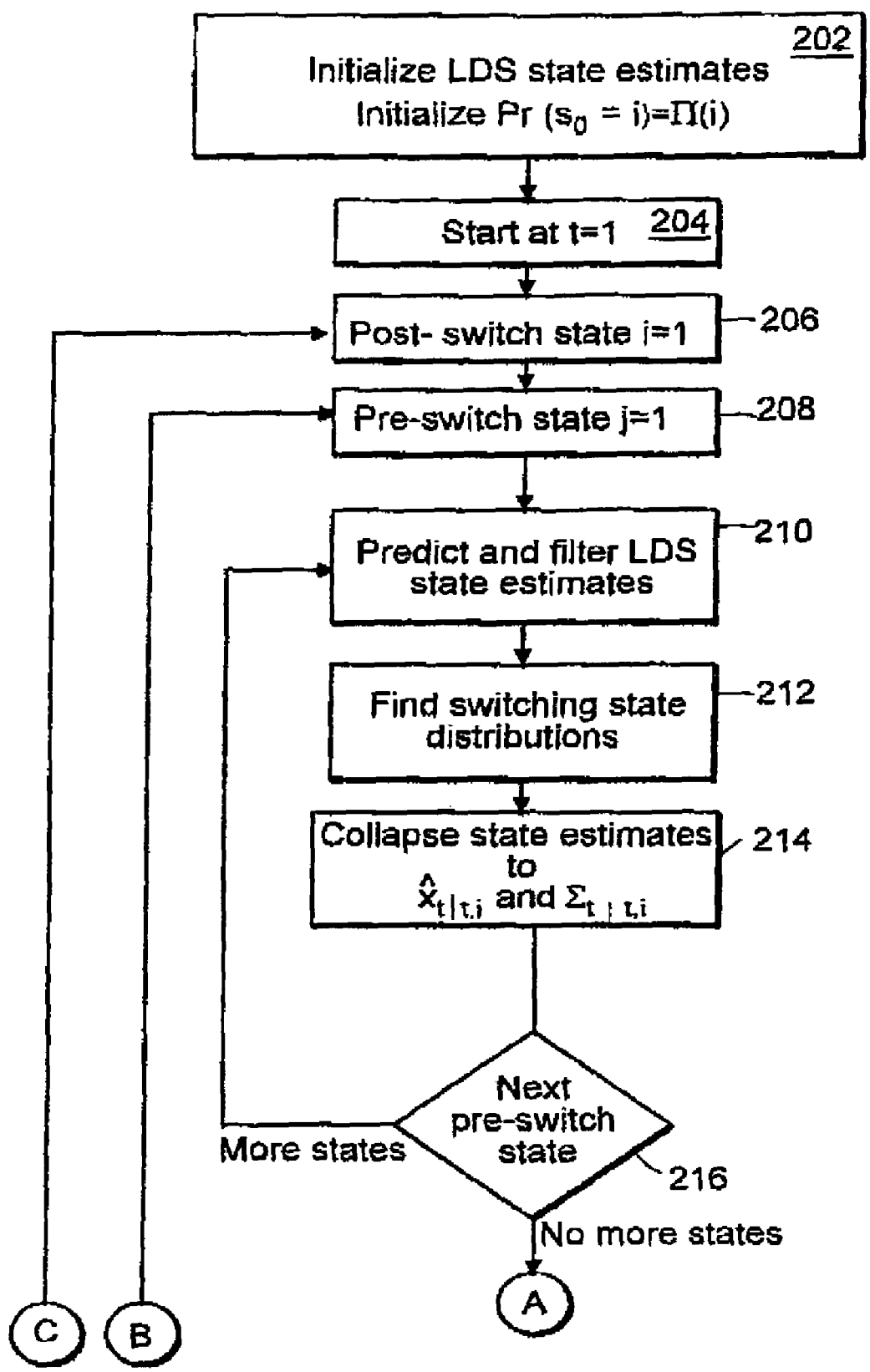
FIGS. 8A and 8B comprise a flowchart illustrating the steps performed by a GPB2 embodiment of the present invention.
Figure 8B:
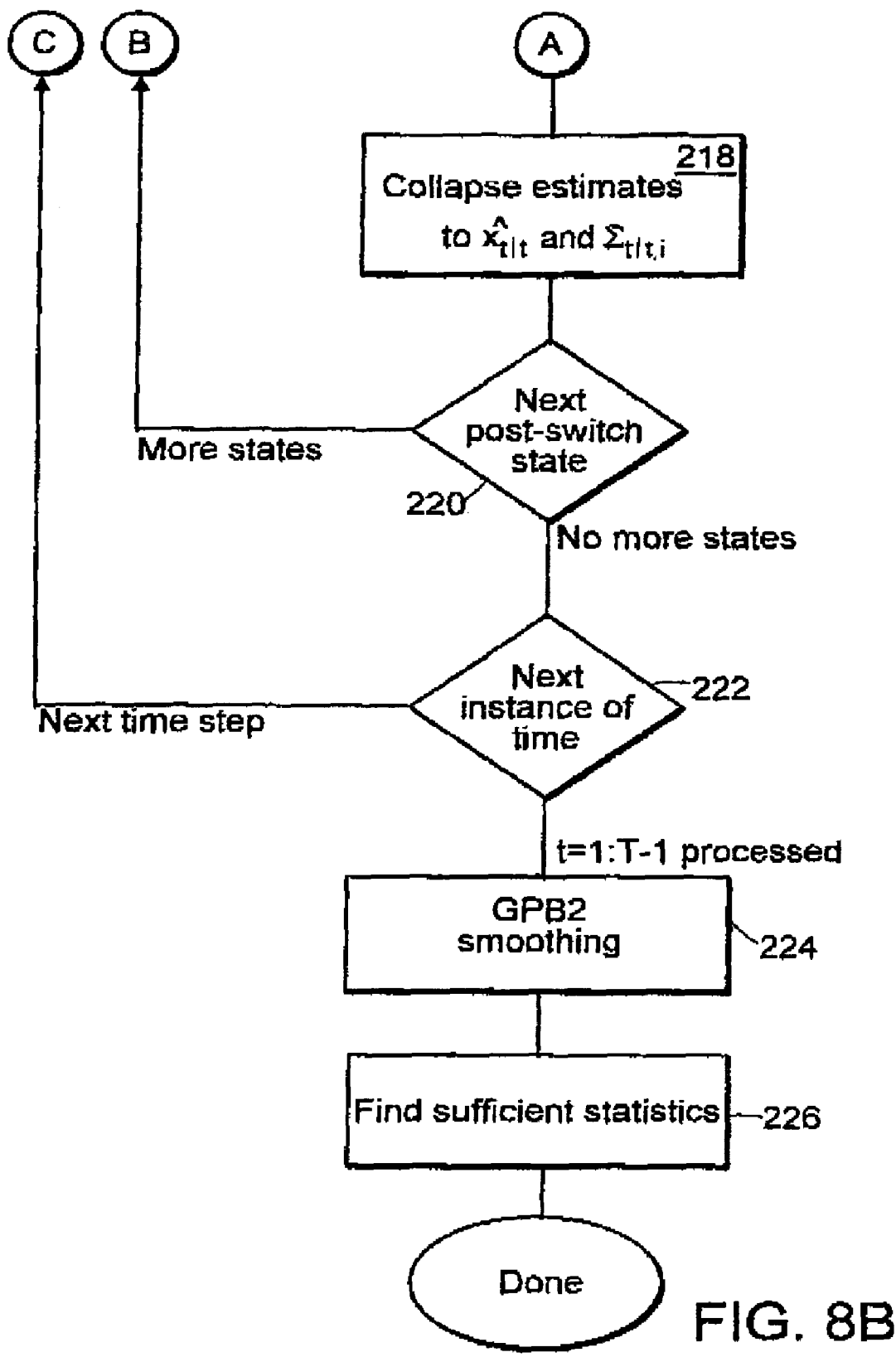

FIGS. 8A and 8B comprise a flowchart illustrating the steps employed by a GPB2 embodiment, as summarized by the following steps:

Initialize LDS state estimates $\hat{x}_{0|-1,i}$ and $\Sigma_{0|-1,i}$; (Step 202)
Initialize $Pr(s_0=i)=\pi(i)$, for i=0, ..., S-1 (Step 202)

```
Initialize Pr(s₀ = i) = p(i), for i=0, ... ,S-1;     (Step 202)
for t = 1:T-1                                        (Steps 204, 222)
    for i = 1:S                                      (Steps 206, 220)
        for j = 1:S                                  (Steps 208, 216)
            Predict and filter LDS state estimates x̂ₜ|ₜ,ᵢ,ⱼ, Σₜ|ₜ,ᵢ,ⱼ;
                                                     (Step 210)
            Find switching state distributions
                Pr(sₜ = i|Yₜ), Pr(sₜ₋₁ ₁ = j|sₜ = i,Yₜ); (Step 212)
            Collapse x̂ₜ|ₜ,ᵢ,ⱼ, Σₜ|ₜ,ᵢ,ⱼ to x̂ₜ|ₜ,ᵢ, Σₜ|ₜ,ᵢ;   (Step 214)
        end
        Collapse x̂ₜ|ₜ,ᵢ and Σₜ|ₜ,ᵢ to x̂ₜ|ₜ and Σₜ|ₜ,ᵢ.    (Step 218)
    end
end
Do GPB2 smoothing;                                   (Step 224)
Find sufficient statistics.                          (Step 226)
```

The inference process of the GPB2 embodiment is clearly more involved than those of the Viterbi or the variational approximation embodiments. Unlike Viterbi, GPB2 provides soft estimates of switching states at each time t. Like Viterbi, GPB2 is a local approximation scheme and as such does not guarantee global optimality inherent in the variational approximation. However, Xavier Boyen and Daphne Koller, "Tractable inference for complex stochastic processes," Uncertainty in Artificial Intelligence, pages 33–42, Madison, Wis., 1998, provides complex conditions for a similar type of approximation in general DBNs that lead to globally optimal solutions.

Learning of SLDS Parameters

Learning in SLDSs can be formulated as the problem of maximum likelihood learning in general Bayesian networks. Hence, a generalized Expectation-Maximization (EM) algorithm can be used to find optimal values of SLDS parameters $\{A_0, \ldots, A_{s-1}, C, Q_0, \ldots, Q_{s-1}, R, \Pi, \pi_0\}$. A description of generalized EM can be found in, for example, Neal et al., "A new view of the EM algorithm that justifies incremental and other variants," in the collection "Learning in graphical models," (M. Jordan, editor), pages 355–368. MIT Press, 1999.

The EM algorithm consists of two steps, E and M, which are interleaved in an iterative fashion until convergence. The essential step is the expectation (E) step. This step is also known as the inference problem. The inference problem was considered in the two preferred embodiments of the method.

Given the sufficient statistics from the inference phase, it is easy to obtain parameter update equations for the maximization (M) step of the EM algorithm. Updated values of the model parameters are easily shown to be $$\hat{A}_i = \left( \sum_{t=1}^{T-1} \langle x_t x'_{t-1} s_t(i) \rangle \right) \left( \sum_{t=1}^{T-1} \langle x_{t-1} x'_{t-1} s_t(i) \rangle \right)^{-1}$$

$$\hat{Q}_i = \left( \sum_{t=1}^{T-1} \langle x_t x'_t s_t(i) \rangle - \hat{A}_i \langle x_{t-1} x'_t s_t(i) \rangle \right) \left( \sum_{t=1}^{T-1} \langle s_t(i) \rangle \right)^{-1}$$

$$\hat{C} = \left( \sum_{t=0}^{T-1} y_t \langle x'_t \rangle \right) \left( \sum_{t=0}^{T-1} \langle x_t x' \rangle \right)^{-1}$$

$$\hat{R} = \frac{1}{T} \sum_{t=0}^{T-1} \left( y_t y'_t - \hat{C} \langle x_t \rangle y'_t \right)$$

$$\hat{\Pi} = \left( \sum_{t=1}^{T-1} \langle s_t s'_{t-1} \rangle \right) \text{diag} \left( \sum_{t=1}^{T-1} \langle s_t \rangle \right)^{-1}$$

$$\hat{\pi}_0 = \langle s_0 \rangle.$$

The operator $\langle \cdot \rangle$ denotes conditional expectation with respect to the posterior distribution, e.g. $\langle x_t \rangle = \Sigma_s \int_x x_t P(X, S|Y)$.

All the variable statistics are evaluated before updating any parameters. Notice that the above equations represent a generalization of the parameter update equations of classical (non-switching) LDS models.

The coupled E and M steps are the key components of the SLDS learning method. While the M step is the same for all preferred embodiments of the method, the E-step will vary with the approximate inference method.

Applications of SLDS

We applied our SLDS framework to the analysis of two categories of fronto-parallel motion: walking and jogging. Fronto-parallel motions exhibit interesting dynamics and are free from the difficulties of 3-D reconstruction. Experiments can be conducted easily using a single video source, while self-occlusions and cluttered backgrounds make the tracking problem non-trivial.

The kinematics of the figure are represented by a 2-D Scaled Prismatic Model (SPM). This model is described in Morris et al., "Singularity analysis for articulated object tracking," Proceedings of Computer Vision and Pattern Recognition, pages 289–296, Santa Barbara, Calif., Jun. 23–25, 1998. The SPM lies in the image plane, with each link having one degree of freedom (DOF) in rotation and another DOF in length. A chain of SPM transforms can model the image displacement and foreshortening effects produced by 3-D rigid links. The appearance of each link in the image is described by a template of pixels which is manually initialized and deformed by the link's DOFs.

In our figure tracking experiments, we analyzed the motion of the legs, torso, and head, while ignoring the arms. Our kinematic model had eight DOFs, corresponding to rotations at the knees, hip and neck.

Learning

The first task we addressed was learning an SLDS model for walking and running. The training set consisted of eighteen sequences of six individuals jogging and walking at a moderate pace. Each sequence was approximately fifty frames in duration. The training data consisted of the joint angle states of the SPM in each image frame, which were obtained manually.

The two motion types were each modeled as multi-state SLDSs and then combined into a single complex SLDS. The measurement matrix in all cases was assumed to be identity, C=I. Initial state segmentation within each motion type was obtained using unsupervised clustering in a state space of some simple dynamics model, e.g., a constant velocity model. Parameters of the model (A, Q, R, $x_0$, P, $\pi_0$) were then reestimated using the EM-learning framework with approximate Viterbi inference. This yielded refined segmentation of switching states within each of the models.

Figure 9:
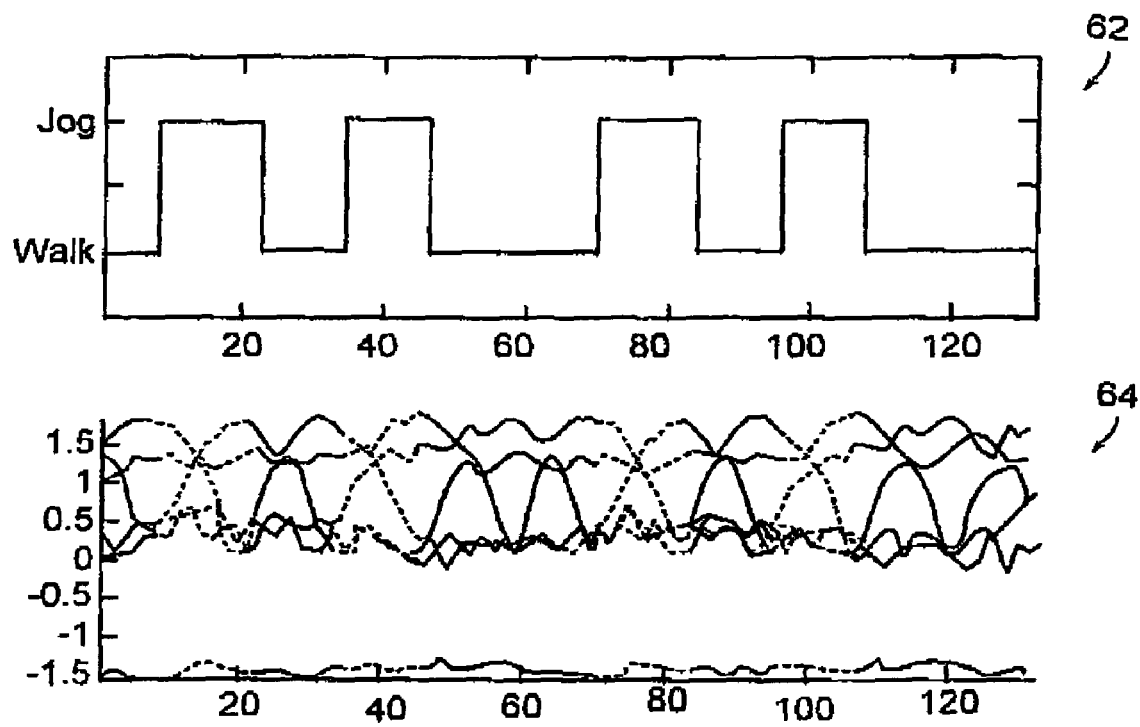
FIG. 9 comprises two graphs which illustrate learned segmentation of a "jog" motion sequence.

FIG. 9 illustrates learned segmentation of a "jog" motion sequence. A two-state SLDS model was learned from a set of exemplary "jog" motion measurement sequences, an example of which is shown in the bottom graph. The top graph 62 depicts decoded switching states ($\langle s_t \rangle$) inferred from the measurement sequence $y_t$, shown in the bottom graph 64, using the learned "jog" SLDS model.

Classification

The task of classification is to segment a state space trajectory into a sequence of motion regimes, according to learned models. For instance, in gesture recognition, one can automatically label portions of a long hand trajectory as some predefined, meaningful gestures. The SLDS framework is particularly suitable for motion trajectory classification.

Figure 10:
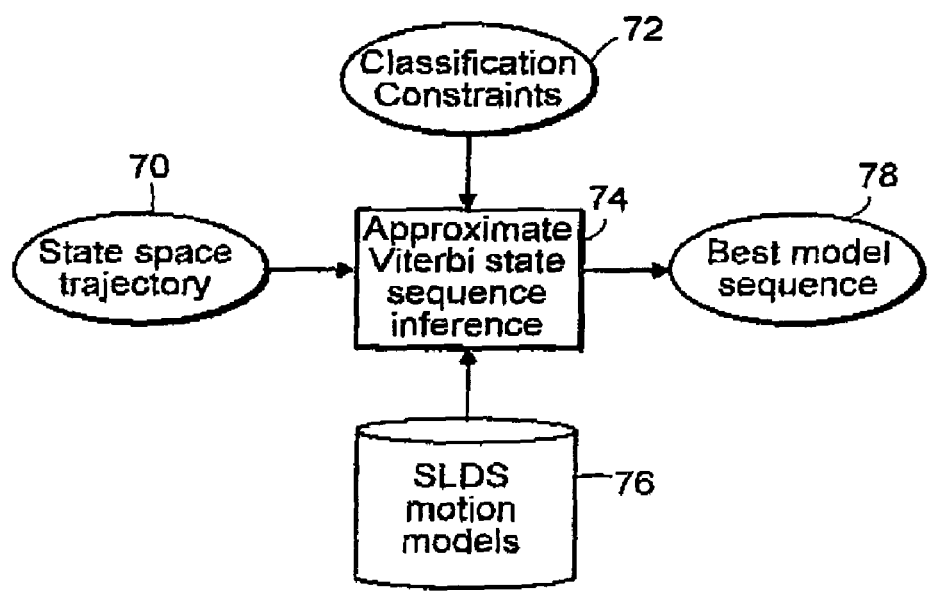
FIG. 10 is a block diagram illustrating classification of state space trajectories, as performed by the present invention.

FIG. 10 illustrates the classification of state space trajectories. Learned SLDS model parameters are used in approximate Viterbi inference 74 to decode a best sequence 78 of models 76 corresponding to the state space trajectory 70 to be classified.

The classification framework follows directly from the framework for approximate Viterbi inference in SLDSs, described previously. Namely, the approximate Viterbi inference 74 yields a sequence of switching states $S_T$ (regime indexes) 70 that best describes the observed state space trajectory 70, assuming some current SLDS model parameters. If those model parameters are learned on a corpus of representative motion data, applying the approximate Viterbi inference on a state trajectory from the same family of motions will then result in its segmentation into the learned motion regimes.

Additional "constraints" 72 can be imposed on classification. Such constraints 72 can model expert knowledge about the domain of trajectories which are to be classified, such as domain grammars, which may not have been present during SLDS model learning. For instance, we may know that out of N available SLDS motion models, only M<N are present in the unclassified data. We may also know that those M models can only occur in some particular, e.g., deterministically or stochastically, known order. These classification constraints can then be superimposed on the SLDS motion model parameters in the approximate Viterbi inference to force the classification to adhere to them. Hence, a number of natural language modeling techniques from human speech recognition, for example, as discussed in Jelinek, "Statistical methods for speech recognition," MIT Press, 1998, can be mapped directly into the classification SLDS domain.

Classification can also be performed using variational and GPB2 inference techniques. Unlike with Viterbi inference, these embodiments yield a "soft" classification, i.e., each switching state at every time instance can be active with some potentially non-zero probability. A soft switching state at time t is $$\sum_{i=0}^{S-1} i \langle s_t(i) \rangle.$$

To explore the classification ability of our learned model, we next considered segmentation of sequences of complex motion, i.e., motion consisting of alternations of "jog" and "walk." Test sequences were constructed by concatenating in random order randomly selected and noise-corrupted training sequences. Transitions between sequences were smoothed using B-spline smoothing. Identification of two motion "regimes" was conducted using the proposed framework in addition to a simple HMM-based segmentation. Multiple choices of linear dynamic system and "jog"/"walk" switching orders were also compared.

Because "jog" and "walk" SLDS models were learned individually, whereas the test data contained mixed "jog" and "walk" regimes, it was necessary to impose classification constraints to combine the two models into a single "jog+walk" model. Since no preference was known a priori for either of the two regimes, the two were assumed equally likely but complementary, and their individual two-state switching models $P_{jog}$ and $P_{walk}$ were concatenated into a single four-state switching model $P_{jog+walk}$. Each state of this new model simply carried over the LDS parameters of the individual "jog" and "walk" models.

Estimates of "best" switching states $\langle s_t \rangle$ indicated which of the two models can be considered to be driving the corresponding motion segment.

Figure 11:
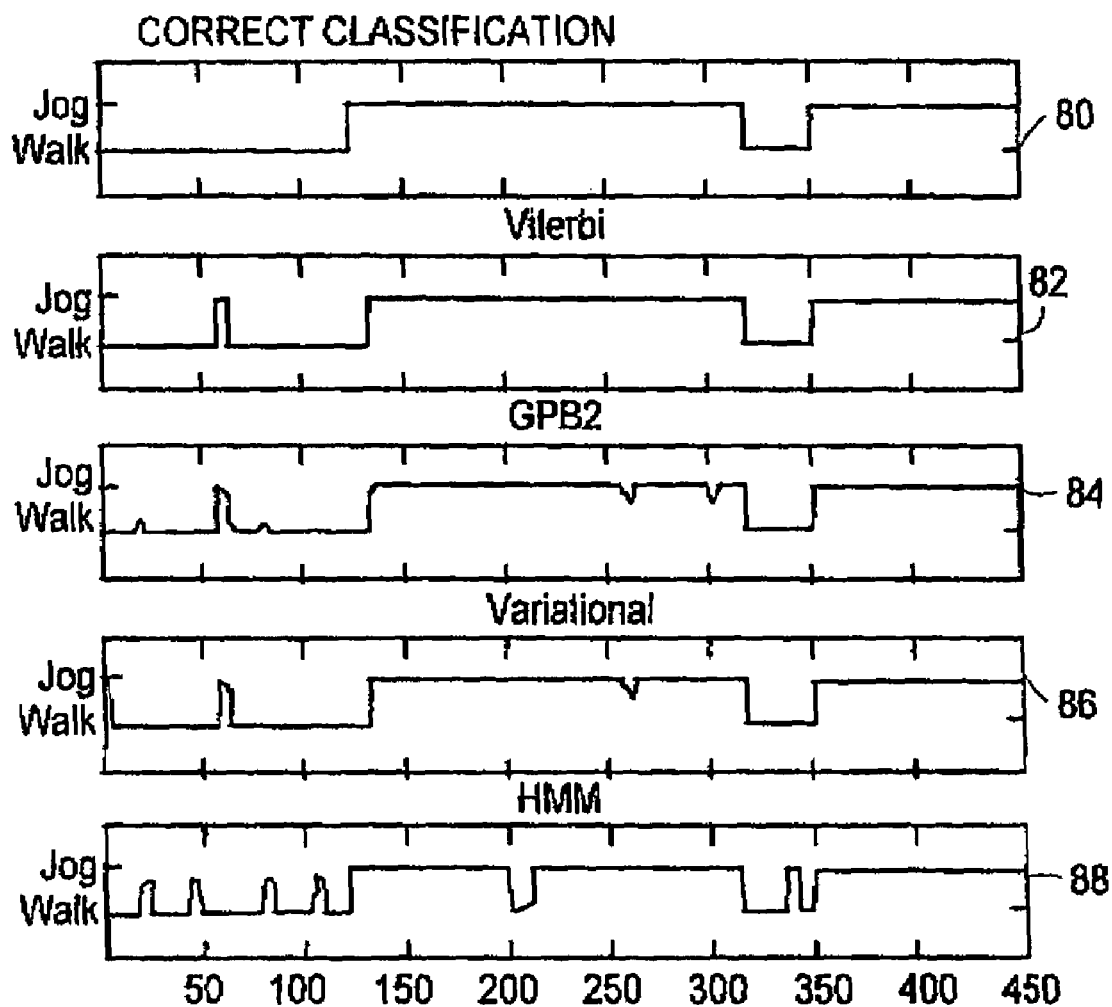
FIG. 11 comprises several graphs which illustrate an example of segmentation.

FIG. 11 illustrates an example of segmentation, depicting true switching state sequence (sequence of jog-walk motions) in the top graph, followed by HMM, Viterbi, GPB2, and variational state estimates using one switching state per motion type models, first order SLDS model.

FIG. 11 contains several graphs which illustrate the impact of different learned models and inference methods on classification of "jog" and "walk" motion sequences, where learned "jog" and "walk" motion models have two switching states each. Continuous system states of the SLDS model contain information about angle of the human figure joints. The top graph 80 depicts correct classification of a motion sequence containing "jog" and "walk" motions (measurement sequence is not shown). The remaining graphs 82–88 show inferred classifications using, respectively from top to bottom, SLDS model with Viterbi inference, SLDS model with GPB2 inference, SLDS model with variational inference, and HMM model.

Similar results were obtained with four switching states each and second order SLDS.

Classification experiments on a set of 20 test sequences gave an error rate of 2.9% over a total of 8312 classified data points, where classification error was defined as the difference between inferred segmentation (the estimated switching states) and true segmentation (true switching states) accumulated over all sequences, $$\text{error} = \sum_{t=0}^{T-1} |\langle s_t \rangle - s_{true,t}|.$$

Tracking

The SLDS learning framework can improve the tracking of target objects with complex dynamical behavior, responsive to a sequence of measurements. A particular embodiment of the present invention tracks the motion of the human figure, using frames from a video sequence. Tracking systems generally have three identifiable steps: state prediction, measurement processing and posterior update. These steps are exemplified by the well-known Kalman Filter, described in Anderson and Moore, "Optimal Filtering," Prentice Hall, 1979.

Figure 12:
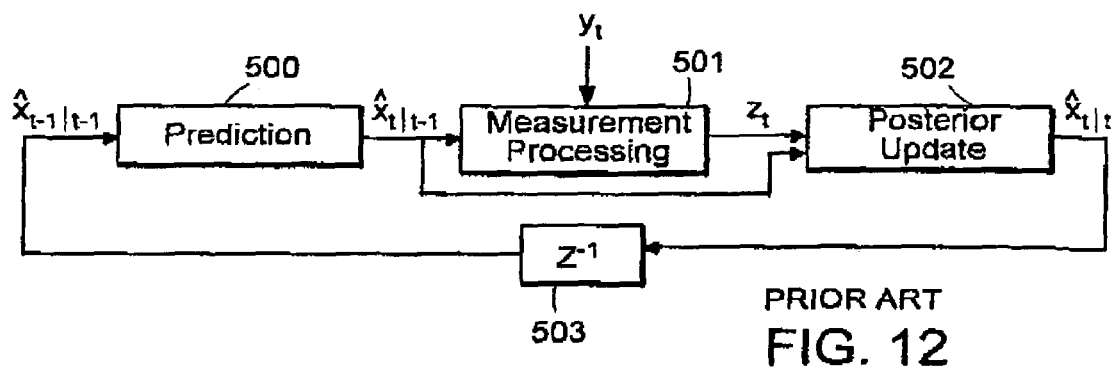
FIG. 12 is a block diagram of a Kalman filter as employed by an embodiment of the present invention.

FIG. 12 is a standard block diagram for a Kalman Filter. A state prediction module 500 takes as input the state estimate from the previous time instant, $\hat{x}_{t-1|t-1}$. The output of the prediction module 500 is the predicted state $\hat{x}_{t|t-1}$. The measurement processing module 501 takes the predicted state, generates a corresponding predicted measurement, and combines it with the actual measurement $y_t$ to form the "innovation" $z_t$. For an image, for example, states might be parameters such as angles, lengths and positions of objects or features, while the measurements might be the actual pixels. The predicted measurements might then be the predictions of pixel values and/or pixel locations. The innovation $z_t$ measures the difference between the predicted and actual measurement data.

The innovation $z_t$ is passed to the posterior update module 502 along with the prediction. They are fused using the Kalman gain matrix to form the posterior estimate $\hat{x}_{t|t}$.

The delay element 503 indicates the temporal nature of the tracking process. It models the fact that the posterior estimate for the current frame becomes the input for the filter in the next frame.

Figure 13:
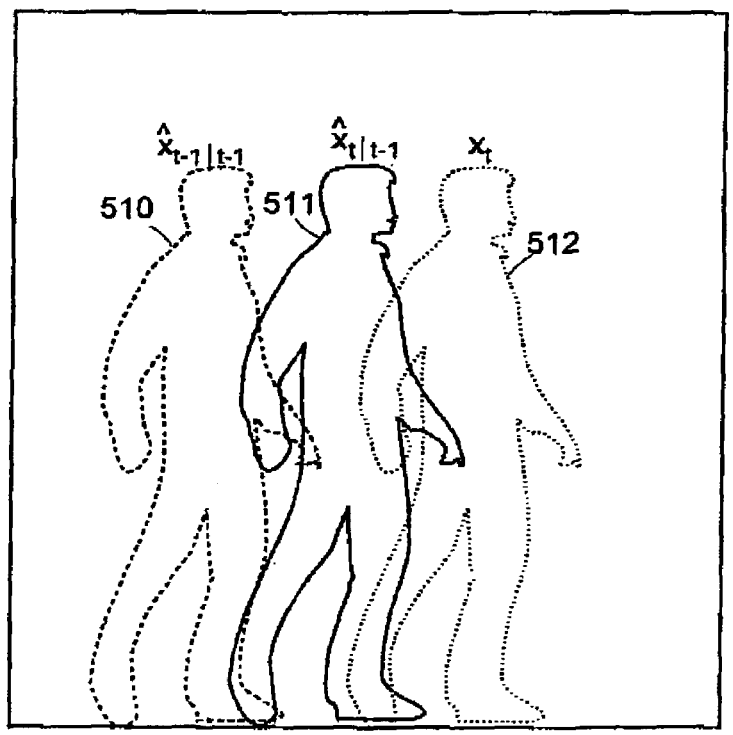
FIG. 13 is a diagram illustrating the operation of the embodiment of FIG. 12 for the specific case of figure tracking.

FIG. 13 illustrates the operation of the prediction module 500 for the specific case of figure tracking. The dashed line 510 shows the position of a skeletal representation of the human figure at time t−1. The predicted position of the figure at time t is shown as a solid line 511. The actual position of the figure in the video frame at time t is shown as a dotted line 512. The unknown state $x_t$ represents the actual skeletal position for the sketched figure.

We now describe the process of computing the innovation $z_t$ which is the task of the measurement processing module 501, in the specific case of figure tracking using template features. A template is a region of pixels, often rectangular in shape. Tracking using template features is described in detail in James M. Rehg and Andrew P. Witkin, "Visual Tracking with Deformation Models," Proceedings of IEEE Conference on Robotics and Automation, April 1991, Sacramento Calif., pages 844–850. In the figure tracking application, a pixel template is associated with each part of the figure model, describing its image appearance. The pixel template is an example of an "image feature model" which describes the measurements provided by the image.

For example, two templates can be used to describe the right arm, one for the lower and one for the upper arm. These templates, along with those for the left arm and the torso, describe the appearance of the subject's shirt. These templates can be initialized, for example, by capturing pixels from the first frame of the video sequence in which each part is visible. The use of pixel templates in figure tracking is described in detail in Daniel D. Morris and James M. Rehg, "Singularity Analysis for Articulated Object Tracking," Proceedings of the IEEE Conference on Computer Vision and Pattern Recognition, June 1998, Santa Barbara Calif., pages 289–296.

Given a set of initialized figure templates, the innovation is the difference between the template pixel values and the pixel values in the input video frame which correspond to the predicted template position. We can define the innovation function that gives the pixel difference as a function of the state vector x and pixel index k:

$$z(x,k) = I_t(pos(x,k)) - T(k) \quad \text{(Eq. 17)}$$

We can then write the innovation at time t as $$z_t(k) = z(\hat{x}_{t|t-1}, k) \quad \text{(Eq. 18)}$$

Equation 18 defines a vector of pixel differences, $z_t$, formed by subtracting pixels in the template model T from a region of pixels in the input video frame $I_t$ under the action of the figure state. In order to represent images as vectors, we require that each template pixel in the figure model be assigned a unique index k. This can be easily accomplished by examining the templates in a fixed order and scanning the pixels in each template in raster order. Thus $z_t(k)$ represents the innovation for the k th template pixel, whose intensity value is given by T(k). Note that the contents of the template T(k) could be, for example, gray scale pixel values, color pixel values in RGB or YUV, Laplacian filtered pixels, or in general any function applied to a region of pixels. We use z(x) to denote the vector of pixel differences described by Equation (e1). Note that $z_t$ does not define an innovation process in the strict sense of the Kalman filter, since the underlying system is nonlinear and non-Gaussian.

The deformation function pos(x,k) in Equation 17 gives the position of the k th template pixel, with respect to the input video frame, as a function of the model state x. Given a state prediction $\hat{x}_{t|t-1}$, the transform $pos(\hat{x}_{t|t-1}, *)$ maps the template pixels into the current image, thereby selecting a subset of pixel measurements. In the case of figure tracking, the pos( ) function models the kinematics of the figure, which determine the relative motion of its parts.

Figure 14:
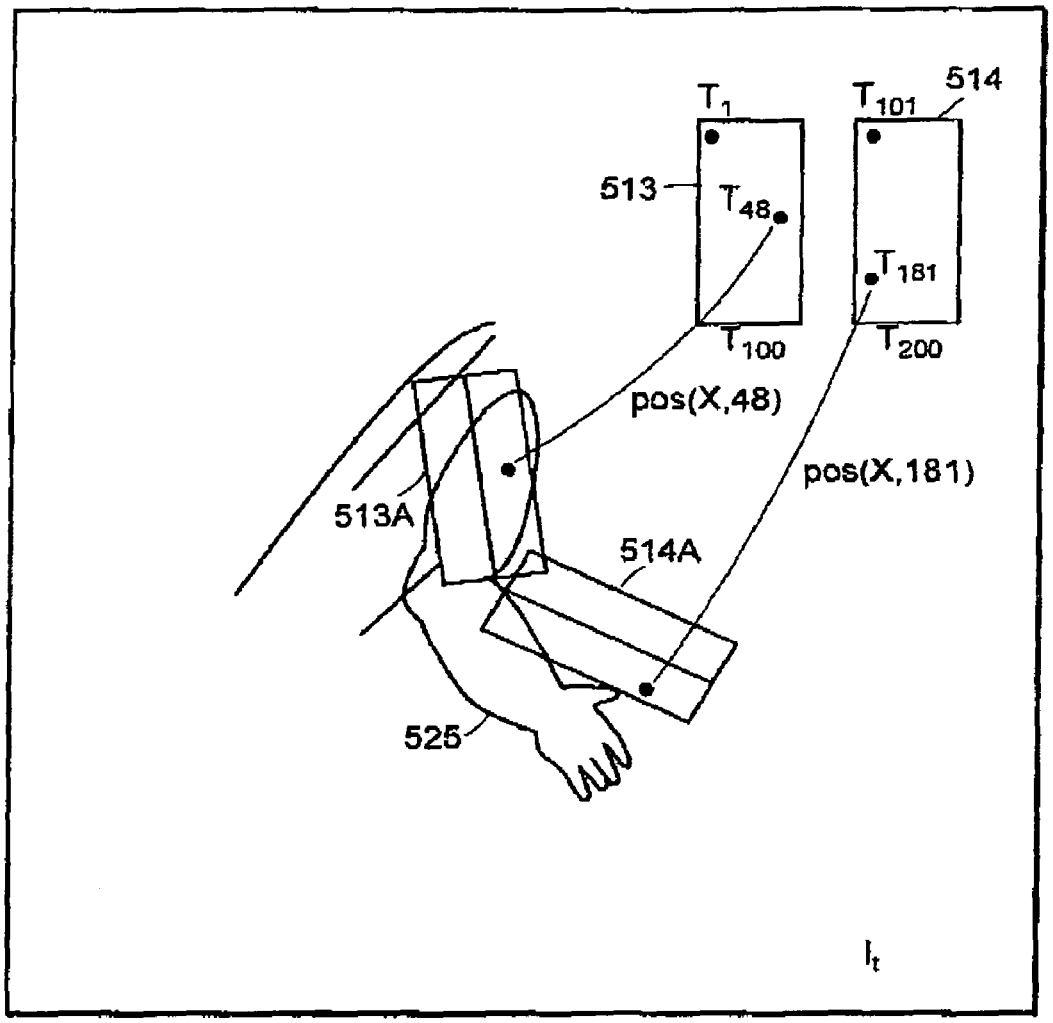
FIG. 14 is a diagram illustrating the mapping of templates.

FIG. 14 illustrates two templates 513 and 514 which model the right arm 525. Pixels that make up these templates 513, 514 are ordered, with pixels $T_1$ through $T_{100}$ belonging to the upper arm template 513, and pixels $T_{101}$ through $T_{200}$ belonging to the lower arm template 514. The mapping pos(x,k) is also illustrated. The location of each template 513, 514 under the transformation is shown as 513A, 514A respectively. The specific transformations of two representative pixel locations, $T_{48}$ and $T_{181}$, are also illustrated.

Alternatively, the boundary of the figure in the image can be expressed as a collection of image contours whose shapes can be modeled for each part of the figure model. These contours can be measured in an input video frame and the innovation expressed as the distance in the image plane between the positions of predicted and measured contour locations. The use of contour features for tracking is described in detail in Demetri Terzopoulos and Richard Szeliski, "Tracking with Kalman Snakes," which appears in "Active Vision," edited by Andrew Blake and Alan Yuille, MIT Press, 1992, pages 3–20. In general, the tracking approach outlined above applies to any set of features which can be computed from a sequence of measurements.

In general, each frame in an image sequence generates a set of "image feature measurements," such as pixel values, intensity gradients, or edges. Tracking proceeds by fitting an "image feature model," such as a set of templates or contours, to the set of measurements in each frame.

A primary difficulty in visual tracking is the fact that the image feature measurements are related to the figure state only in a highly nonlinear way. A change in the state of the figure, such as raising an arm, induces a complex change in the pixel values produced in an image. The nonlinear function I(pos(x,*)) models this effect. The standard approach to addressing this nonlinearity is to use the Iterated Extended Kalman Filter (IEKF), which is described in Anderson and Moore, section 8.2. In this approach, the nonlinear measurement model in Equation 17 is linearized around the state prediction $\hat{x}_{t|t-1}$.

The linearizing function can be defined as $$M_t(x, k) = \nabla I_t(pos(x, k))' \frac{\partial pos}{\partial x}(x, k) \quad \text{(Eq. 19)}$$

The first term on the right in Equation 19, $\nabla I_t(pos(x,k))'$, is the image gradient $\nabla I_t$, evaluated at the image position of template pixel k. The second term, $$\frac{\partial pos}{\partial x}(x, k),$$

is a 2×N kinematic Jacobian matrix, where N is the number of states, or elements, in x. Each column of this Jacobian gives the displacement in the image at pixel position k due to a small change in one of the model states. $M_t(x,k)$ is a 1×N row vector. We denote by $M_t(x)$ the M×N matrix formed by stacking up these rows for each of the M pixels in the template model. The linearized measurement model can then be written:

$$\bar{C}_t = M_t(\hat{x}_{t|t-1}) \quad \text{(Eq. 20)}$$

The standard Kalman filter equations can then be applied using the linearized measurement model from Equation 20 and the innovation from Equation 18. In particular, the posterior update equation (analogous to Equation 11 in the linear case) is:

$$\hat{x}_{t|t} = \hat{x}_{t|t-1} + L_t z_t \quad \text{(Eq. 21)}$$

where $L_t$ is the appropriate Kalman gain matrix formed using $\bar{C}_t$.

Figure 15:
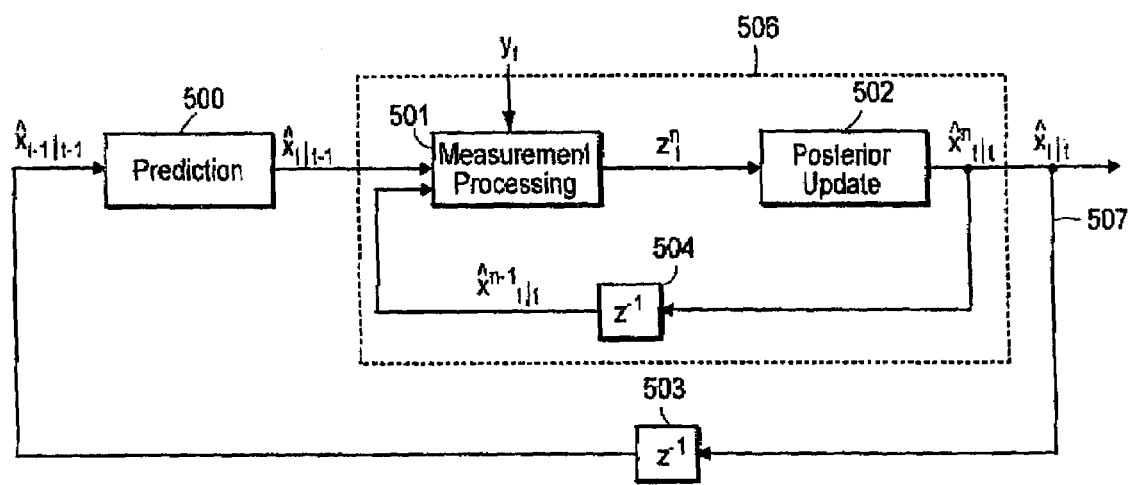
FIG. 15 is a block diagram of an iterated extended Kalman filter (IEKF).

FIG. 15 illustrates a block diagram of the IEKF. In comparison to FIG. 12, the measurement processing 501 and posterior update 502 blocks within the dashed box 506 are now iterated P times with the same measurement $y_t$, for some predetermined number P, before the final output 507 is reported and a new measurement $y_t$ is introduced. This iteration produces a series of innovations $z_t^n$ and posterior estimates $$\hat{x}_{t|t}^n$$

which result from the successive linearizations of the measurement model around the previous posterior estimate $$\hat{x}_{t|t}^{n-1}.$$

The iterations are initialized by setting $$\hat{x}_{t|t}^1 = \hat{x}_{t|t-1}.$$

Upon exiting, we set $$\hat{x}_{t|t} = \hat{x}_{t|t}^P.$$

In cases where the prediction is far from the correct state estimate, these iterations can improve accuracy. We denote as the "IEKF update module" 506 the subsystem of measurement processing 501 and posterior update 502 blocks, as well as delay 504, although in practice, delays 503 and 504 may be the same piece of hardware and/or software.

Clearly the quality of the IEKF solution depends upon the quality of the state prediction. The linearized approximation is only valid within a small range of state values around the current operating point, which is initialized by the prediction. More generally, there are likely to be many background regions in a given video frame that are similar in appearance to the figure. For example, a template that describes the appearance of a figure wearing a dark suit might match quite well to a shadow cast against a wall in the background. The innovation function defined in Equation 17 can be viewed as an objective function to be minimized with respect to x. It is clear that this function will in general have many local minima. The presence of local minima poses problems for any iterative estimation technique such as IEKF. An accurate prediction can reduce the likelihood of becoming trapped in a local minima by bringing the starting point for the iterations closer to the correct answer.

As alluded to previously, the dynamics of a complex moving object such as the human figure cannot be expressed using a simple linear dynamic model. Therefore, it is unlikely that the standard IEKF framework described above would be effective for figure tracking in video. A simple linear prediction of the figure's state would not provide sufficient accuracy in predicting figure motion.

The SLDS framework of the present invention, in contrast, can describe complex dynamics as a switched sequence of linear models. This framework can form an accurate predictor for video tracking. A straightforward implementation of this approach can be extrapolated directly from the approximate Viterbi inference.

In the first tracking embodiment, the Viterbi approach generates a set of $S^2$ hypotheses, corresponding to all possible transitions i, j between linear models from time step t−1 to t. Each of these hypotheses represents a prediction for the continuous state of the figure which selects a corresponding set of pixel measurements. It follows that each hypothesis has a distinct innovation equation:

$$z_{t|t-1,i,j} = z(\hat{x}_{t|t-1,i,j}) \quad \text{(Eq. 22)}$$

defined by Equation 17. Note that the only difference in comparison to Equation 18 is the use of the SLDS prediction in mapping templates into the image plane.

This embodiment, using SLDS models, is an application of the Viterbi inference algorithm described earlier to the particular measurement models used in visual tracking.

Figure 16:
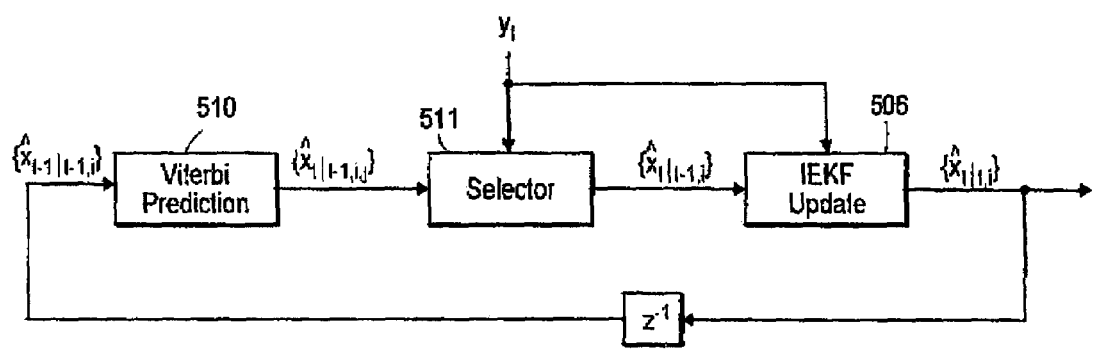
FIG. 16 is a block diagram of an embodiment of the present invention using an IEKF in which a subset of Viterbi predictions is selected and then updated.

FIG. 16 is a block diagram which illustrates this approach. The Viterbi prediction block 510 generates the set of $S^2$ predictions $\hat{x}_{t|t-1,i,j}$ according to Equation 9.

A selector 511 takes these inputs and selects, for each of the S possible switching states at time t, the most likely previous state $\psi_{t-1,i}$, as defined in Equation 13. This step is identical to the Viterbi inference procedure described earlier, except that the likelihood of the measurement sequence is computed using image features such as templates or contours. More specifically, Equation 7 expresses the transition likelihood $J_{t|t-1,i,j}$ as the product of the measurement probability and the transition probability from the Markov chain.

In the case of template features, the measurement probability can be written $$P(y_{t|t-1,i,j}) = P(y_t|s_t = e_i, s_{t-1} = e_j, S^*_{t-2}(j)) \approx N(z_{t|t-1,i,j}; 0, C_{t|t-1,i,j} \Sigma_{t|t-1,i,j} C'_{t|t-1,i,j} + R) \quad \text{(Eq. 23)}$$

where $\overline{C}_{t|t-1,i,j} = M_t(\hat{x}_{t|t-1,i,j})$. The difference between Equations 23 and 12 is the use of the linearized measurement model for template features. By changing the measurement probability appropriately, the SLDS framework above can be adopted to any tracking problem.

The output of the selector 511 is a set of S hypotheses corresponding to the most probable state predictions given the measurement data. These are input to the IEKF update block 506, which filters these predictions against the measurements to obtain a set of S posterior state estimates. This block was illustrated in FIG. 15. This step applies the standard equations for the IEKF to features such as templates or contours, as described in Equations 17 through 21. The posterior estimates can be decoded and smoothed analogously to the case of Viterbi inference.

In computing the measurement probabilities, the selector 511 must make $S^2$ comparisons between all of the model pixels and the input image. Depending upon the size of the target and the image, this may represent a large computation. This computation can be reduced by considering only the Markov process probabilities and not the measurement probabilities in computing the best S switching hypotheses. In this case, the best hypotheses are given by $$i^*_t = \arg\min_j\{-\log\Pi(i,j) + J_{t-1,j}\} \quad \text{(Eq. 24)}$$

This is a substantial reduction in computation, at the cost of a potential loss of accuracy in picking the best hypotheses.

Figure 17:
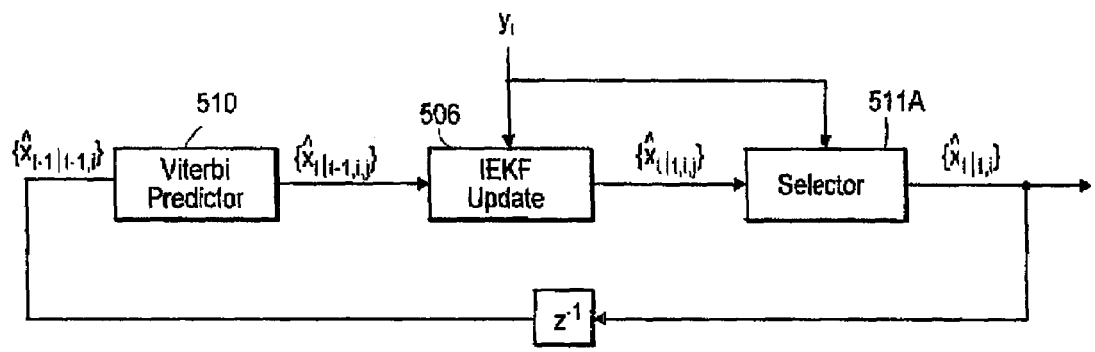
FIG. 17 is a block diagram of an embodiment in which Viterbi predictions are first updated, after which a subset is selected.

FIG. 17 illustrates a second tracking embodiment, in which the order of the IEKF update module 506 and selector 511A is reversed. In this case, the set of $S^2$ predictions are passed directly to the IEKF update module 506. The output of the update module 506 is a set of $S^2$ filtered estimates $\hat{x}_{t|t,i,j}$, each of which is the result of P iterations of the IEKF. As with the embodiment of FIG. 16, it is still necessary to reduce the total set of estimates to S hypotheses in order to control the complexity of the tracker.

The selector 511A chooses the most likely transition $j^* \rightarrow i$, for each switching state based on the filtered estimates. This is analogous to the Viterbi inference case, which was described in the embodiment of FIG. 16 above. The key step is to compute the switching costs $J_{t,i}$ defined in Equations 5 and 6. The difference in this case comes from the fact that the probability of the measurement is computed using the filtered posterior estimate rather than the prediction. This probability is given by:

$$P(y_{t|t,i,j}) = P(y_t|s_t = e_i, s_{t-1} = e_j, \hat{x}_{t|t,i,j}, S^*_{t-2}(j)) \approx N(z(\hat{x}_{t|t,i,j}); 0, M_t(\hat{x}_{t|t,i,j}) \Sigma_{t|t,i,j} M_t(\hat{x}_{t|t,i,j})' + R)$$

The switching costs are then given by $$J_{t,i} = \max_j\{J_{t|t,i,j} J_{t-1,j}\} \quad \text{(Eq. 25A)}$$

where the "posterior transition probability" from state j at time t−1 to state i at time t is written $$J_{t|t,i,j} = P(y_{t|t,i,j})P(s_t = e_i|s_{t-1} = e_j) \quad \text{(Eq. 25B)}$$

The selector 511A selects the transition $j^* \rightarrow i$, where $j = \arg\max_j\{J_{t|t,i,j}, J_{t-1|j}\}$. The state $j^*$ is the "optimal posterior switching state," and its value depends upon the posterior estimate for the continuous state at time t.

The potential advantage of this approach is that all of the $S^2$ predictions are given an opportunity to filter the measurement data. Since the system is nonlinear, it is possible that a hypothesis which has a low probability following prediction could in fact produce a posterior estimate which has a high probability.

The set of $S^2$ predictions used in the embodiments of FIGS. 16 and 17 can be viewed as specifying a set of starting points for local optimization of an objective function defined by $\|z_t(x)\|^2$. In fact, as the covariance for the plant noise approaches infinity, the behavior of the IEKF module 506 approaches steepest-descent gradient search because the dynamic model no longer influences the posterior estimate.

When the objective function has many local minima relative to the uncertainty in the state dynamics, it may be advantageous to use additional starting points for search beyond the $S^2$ values provided by the SLDS predictor. This can be accomplished, for example, by drawing additional starting points at random from a "continuous state sampling density." Additional starting points can increase the chance that one of the IEKF tracks will find the global minimum. We therefore first describe a procedure for generating additional starting points and then describe how they can be incorporated into the previous two embodiments.

A wide range of sampling procedures is available for generating additional starting points for search. In order to apply the IEKF update module 506 at a given starting point, a state prediction must be specified and a particular dynamic model selected. The easiest way to do this is to assume that new starting points are going to be obtained by sampling from the mixture density defined by the set of $S^2$ predictions. This density can be derived as follows:

$$P(x_t | Y_{t-1}) = \sum_{i,j} P(x_t|s_t = e_i, s_{t-1} = e_j, S_{t-2}, Y_{t-1})$$

$$P(s_t = e_i, s_{t-1} = e_j, S_{t-2}, Y_{t-1}) \approx \sum_{i,j} P(x_t|s_t = e_i, s_{t-1} = e_j,$$

$$S_{t-2} = S^*_{t-2}(j), Y_{t-1})P(s_t = e_i, s_{t-1} = e_j, S_{t-2} = S^*_{t-2}(j)|Y_{t-1})$$

The first term in the summed product is a Gaussian prior density from the Viterbi inference step. The second term is its likelihood, a scalar probability which we denote $\alpha_{i,j}$. Rewriting in the form of a mixture of $S^2$ Gaussian kernels, i.e., the predictions, yields:

$$P(x_t|Y_{t-1}) \approx \sum_{i,j} \alpha_{i,j} K_{i,j}(x_t) = \sum_{i,j} \alpha_{i,j} N\left[x_t; \hat{x}_{t|t-1,i,j}, \sum_{t|t-1,i,j}\right] \quad \text{(Eq. 26)}$$

where $\alpha_{i,j}$ can be further expanded as $$\alpha_{i,j} = p(s_t = e_i|s_{t-1} = e_j, S^*_{t-2}(j), Y_{t-1})P(s_{t-1} = e_j, S^*_{j-2}(j)|Y_{t-1}) =$$

$$P(s_t = e_i|s_{t-1} = e_j)\frac{P(s_{t-1} = e_j, S^*_{t-2}(j), Y_{t-1})}{P(Y_{t-1})}$$

Applying Equation 1 to the first term and Equations 5 and 8 to the second term yields $$\alpha_{i,j} = \frac{\Pi(i, j)J_{t-1,j}}{P(Y_{t-1})} \quad \text{(Eq. 27)}$$

All of the terms in the numerator of Equation 27 are directly available from the Viterbi inference method. The denominator is a constant normalizing factor which can be rewritten to yield $$\alpha_{i,j} = \frac{\Pi(i, j)J_{t-1,j}}{\sum_{i,j} \Pi(i, j)J_{t-1,j}} \quad \text{(Eq. 28)}$$

Equations 26 and 28 define a "Viterbi mixture density" from which additional starting points for search can be drawn. The steps for drawing R additional points are as follows:

Find mixture parameters, $\alpha_{i,j}, x_{t|t-1,i,j}$, and $\Sigma_{t|t-1,i,j}$ from Viterbi prediction For r=1 to R Select a kernel $K_{i_r,j_r}$ at random according to the discrete distribution $\{\alpha_{i,j}\}$ Select a state sample $x_{i_r,j_r}$ at random according to the predicted Gaussian distribution $K_{i_r,j_r}$ End The rth sample is associated with a specific prediction $(i_r,j_r)$, making it easy to apply the IEKF.

Given a set of starting points, we can apply the IEKF approach by modifying the IEKF equations to support linearization around arbitrary points. Consider a starting point $\bar{x}$. The nonlinear measurement model for template tracking can be written $$z_t(x_t)=w_t$$

Expanding around $\bar{x}$, discarding high-order terms and rearranging gives $$\bar{y}_t = z_t(\bar{x}) - \bar{C}_t\bar{x} = -\bar{C}_tx_t + w_t$$

where the auxiliary measurement $\bar{y}_t$ has been defined to give a measurement model in standard form. It follows that the posterior update equation is $$\hat{x}_{t|t} = \hat{x}_{t|t-1} + L_t(z_t(\bar{x}) + \bar{C}_t(\hat{x}_{t|t-1} - \bar{x})) \quad \text{(Eq. 29)}$$

Note that if $\bar{x} = x_{t|t-1}$, which is the standard operating point for IEKF, then the above reduces to Equation 21. The additional term captures the effect of the new operating point. Equation 29 defines a modification of the IEKF update block to handle arbitrary starting points in computing the posterior update.

Note that the smoothness of the underlying nonlinear measurement model will determine the region in state space over which the linearized model $\bar{C}_t$ is an accurate approximation. This region must be large enough relative to the distance $\|\hat{x}_{t|t-1}-\bar{x}\|$. This requirement may not be met by a complex objective function.

An alternative in that case is to apply a standard gradient descent approach instead of IEKF, effectively discounting the role of the prior state prediction. A multiple hypothesis tracking (MHT) approach which implements this procedure is described in Tat-Jen Cham and James M. Rehg, "A Multiple Hypothesis Approach to Figure Tracking," Proceedings of the IEEE Conference on Computer Vision and Pattern Recognition, June 1999, Ft. Collins, Colo., pages 239–245, incorporated herein by reference in its entirety. Although this article does not describe tracking with an SLDS model or sampling from an SLDS prediction, the MHT procedure provides a means for propagating a set of sampled states given a complex measurement function. This means can be used as an alternative to the IEKF update step.

Figure 18:
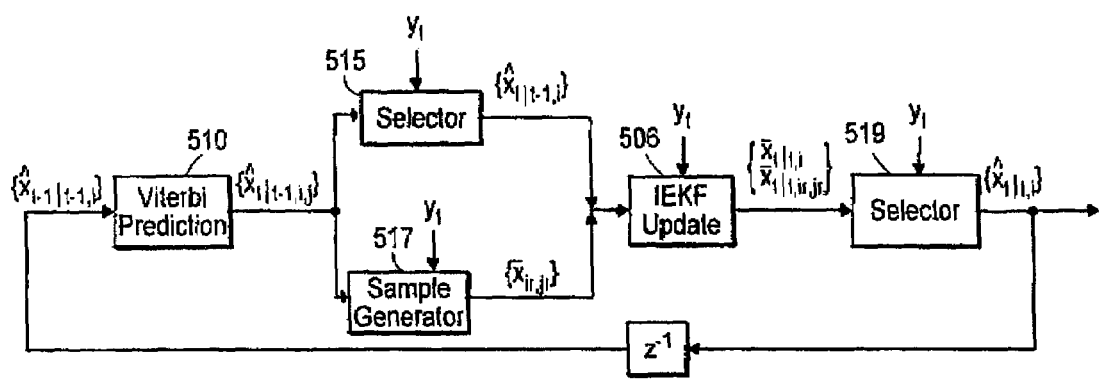
FIG. 18 is a block diagram of an embodiment which combines SLDS prediction with sampling from a prior mixture density.

FIG. 18 is a block diagram of a tracking embodiment which combines SLDS prediction with sampling from the prior mixture density to perform tracking. The output of the Viterbi predictor 510 follows two paths. The top path is similar to the embodiment of FIG. 16. The predictions are processed by a selector 515 and then input to an IEKF update block 506.

Along the bottom path in FIG. 18, the predictions are input to a sample generator 517, which produces a new set of R sample points for filtering, $\{x_{i_r,j_r}\}_{r=1}^R$. This set is unioned with the SLDS predictions from the selector 515 and input to the IEKF block 506. The output of the IEKF block 506 is a joint set of filtered estimates, corresponding to the SLDS predictions, which we now write as $x_{t|t,i}$, and the sampled states $x_{t|t,i_r,j_r}$.

This combined output forms the input to a final selector 519 which selects one filtered estimate for each of the switching states to make up the final output set. This selection process is identical to the ones described earlier with respect to FIG. 17, except that there now can be more than one possible estimate for a given state transition (i,j), corresponding to different starting points for search.

Figure 19:
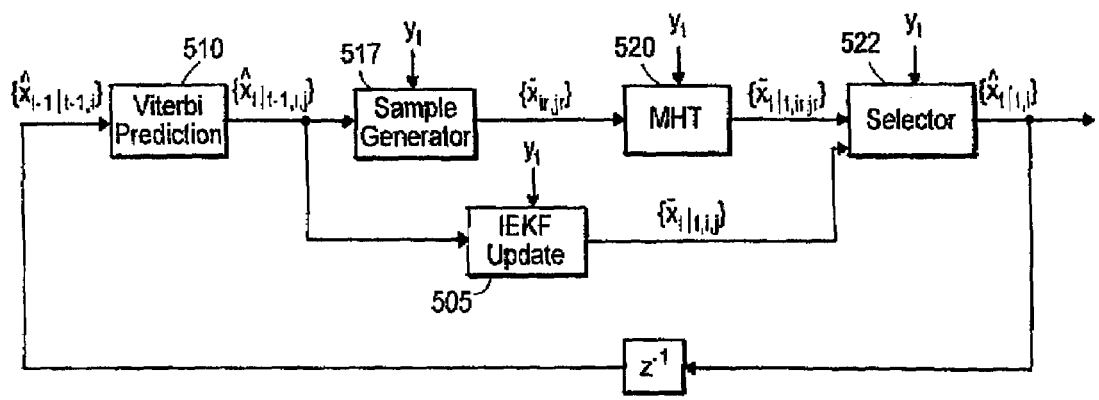
FIG. 19 is a block diagram of an embodiment in which Viterbi estimates are combined with updated samples drawn from a prior density.

FIG. 19 illustrates yet another tracking embodiment. The output of Viterbi prediction, which comprises "Viterbi estimates," is input directly to an IEKF update block 506 while the output of the sample generator 517 goes to an MHT block 520, which implements the method of Cham and Rehg referred to above. As with the embodiment of FIG. 18, these two sets of filtered estimates are passed to a final selector 522. This final selector 522 chooses S of the posterior estimates, one for each possible switching state, as the final output. As with the embodiment of FIG. 18, this selector uses the posterior switching costs defined in Equation 25B.

It should be clear from the embodiments of FIGS. 18 and 19 that other variations on the same basic approach are also possible. For example, an additional selector can be added following the predictor of FIG. 19, or the MHT block can be replaced by a second IEKF block.

It has been assumed that the selector would be selecting a single most likely state distribution from a set of distributions associated with a particular switching state. Another possibility is to find a single distribution which most closely matches all of the possibilities. This is the Generalized Psuedo Bayesian approximation GPB2, described earlier. In any of the selector blocks for the embodiments discussed above, GPB2 could be used in place of Viterbi approximation as a method for reducing multiple hypotheses for a particular switching state down to a single hypothesis. In cases where no single distribution contains a majority of the probability mass for the set of hypotheses, this approach may be advantageous. The application of the previously described process for GPB2 inference to these embodiments is straightforward.

Synthesis and Interpolation

SLDS was introduced as a "generative" model; trajectories in the state space can be easily generated by simulating an SLDS. Nevertheless, SLDSs are still more commonly employed as a classifier or a filter/predictor than as a generative model. We now formulate a framework for using SLDSs as synthesizers and interpolators.

Consider again the generative model described previously. Provided SLDS parameters have been learned from a corpus of motion trajectories, driving the generative SLDS model with the appropriate state and measurement noise processes and switching model, will yield a state space trajectory consistent with that corpus. In other words, one will draw a sample (trajectory) defined by the probability distribution of the SLDS.

Figure 20:
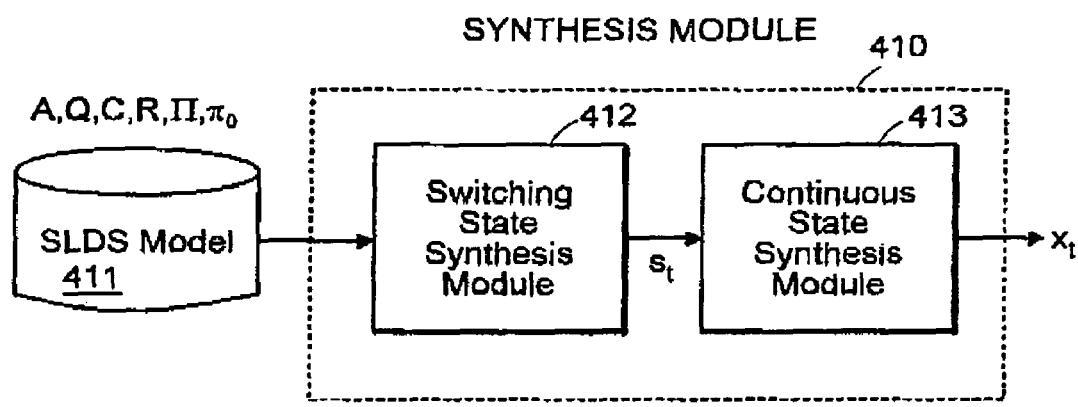
FIG. 20 is a block diagram illustrating an embodiment of the present invention in which the framework for synthesis of state space trajectories in which an SLDS model is used as a generative model.

FIG. 20 illustrates a framework for synthesis of state space trajectories in which the SLDS is used as a generative model within a synthesis module 410. Given the parameters of the SLDS model 411, obtained using either SLDS learning or some other techniques, a switching state sequence $s_t$ is first synthesized in the switching state synthesis module 412 by sampling from a Markov chain with state transition probability matrix $\Pi$ and initial state distribution $\pi_0$. The continuous state sequence $x_t$ is then synthesized in the continuous state synthesis module 413 by sampling from a LDS with parameters $A(s_t)$, $Q(s_t)$, C, R, $x_0(s_0)$, and $Q_0(s_0)$.

The above procedure will produce a random sequence of samples from the SLDS model. If an average noiseless state trajectory is desired, the synthesis can be run with LDS noise parameters ($Q(s_t)$, R, $Q_0(s_0)$) set to zero and switching states whose duration is equal to average state durations, as determined by the switching state transition matrix $\Pi$. For example, this would result in sequences of prototypical walk or jog motions, whereas the random sampling would exhibit deviations from such prototypes. Intermediate levels of randomness can be achieved by scaling the SLDS model noise parameters with factors between 0 and 1.

The model parameters can also be modified to meet new constraints that were, for instance, not present in the data used to learn the SLDS. For example, initial state mean $x_0$, variance $Q_0$ and switching state distribution $\pi$ can be changed so as to force the SLDS to start in some arbitrary state $x_a$ of regime $i_a$, e.g., to start simulation in a "walking" regime $i_a$ with figure posture $x_a$. To achieve this, set $x_0(i_a)= x_a$, $Q_0(i_a)=0$, $\pi(i_a)=1$, and then proceed with the synthesis of this constrained model.

A framework of optimal control can be used to formalize synthesis under constraints. Optimal control of linear dynamic systems is described, for example, in B. Anderson and J. Moore, "Optimal Control: Linear Quadratic Methods," Prentice Hall, Englewood Cliffs, N.J., 1990. For a LDS, the optimal control framework provides a way to design an optimal input or control $u_t$ to the LDS, such that the LDS state $x_t$ gets as close as possible to a desired state $x_t^d$. The desired states can also be viewed as constraint points. The same formalism can be applied to SLDSs. Namely, the system equation, Equation 1, can be modified as $$x_{t+1}=A(s_{t+1})x_t+u_{t+1}+v_{t+1}(s_{t+1}) \qquad \text{(Eq. 1A)}$$

Figure 21:
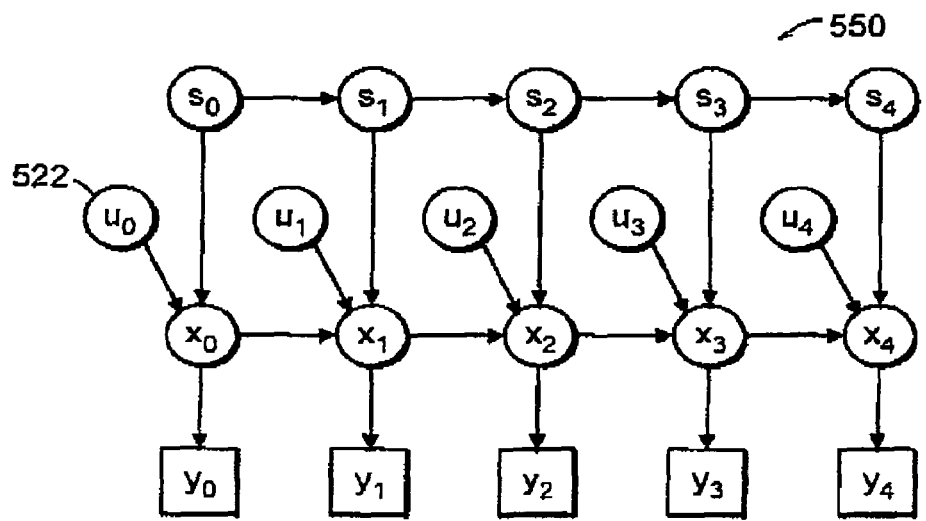
FIG. 21 is a dependency graph of an SLDS model, modified according to an embodiment of the present invention, with added continuous state constraints.

FIG. 21 is a dependency graph of the modified SLDS 550 with added controls $u_t$ 552. A goal is to find $u_t$ that makes $x_t$ as close as possible to a given $x_t^d$. Usually, a quadratic measure of closeness is used, i.e., a control $u_t$ is desired such that the cost $V^{(x)}$, or value function $$V^{(x)} = \left\langle \sum_{t=0}^{T-1} [(x_t - x_t^d)' W_t^{(x)} (x_t - x_t^d) + u_t' W_t^{(u)} u_t] \right\rangle$$

$$\hat{u}_t = \arg\min_u V^{(x)}$$

For instance, if a SLDS is used to simulate a motion of the human figure, $x_t^d$ might correspond to a desired figure posture at key frame t, and $W_t^{(x)}$ might designate the key frame, i.e., $W_t^{(x)}$ is large for the key frame, and small otherwise.

In addition to "closeness" constraints, other types of constraints can similarly be added. For example, one can consider a minimum-time constraint where the terminal timer T is to be minimized with the optimal control $\hat{u}_t$. In that case, the value function to be minimized becomes $V^{(x)} \leftarrow V^{(x)}+T$.

Other types of constraints that can be cast in this framework are the inequality or bounding constraints on the state $x_t$ or control $u_t$(e.g., $x_t > x^{min}$, $u_t < u^{max}$). Such constraints could prevent, for example, the limbs of a simulated human figure from assuming physically unrealistic postures, or the control $u_t$ from becoming unrealistically large.

If $s_t$ is known, the solution for the best control $u_t$ can be derived using the framework of linear quadratic regulators (LQR) for time-varying LDS. When $s_t$ is not known, the estimates of $s_t$ obtained from Viterbi or variational inference can be used and the best control solution can then be found using LQR.

Figure 22:
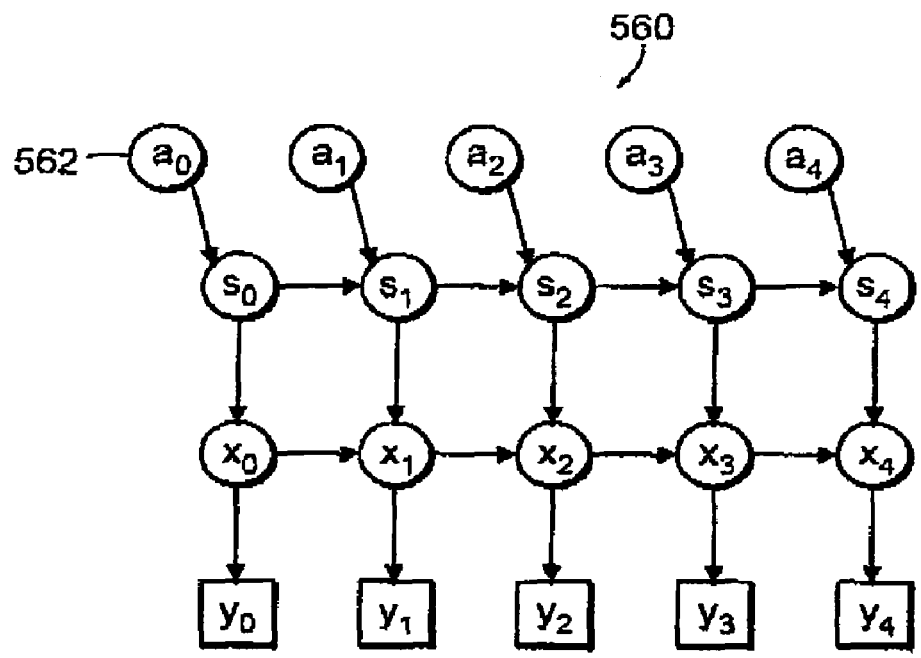
FIG. 22 is a dependency graph of an SLDS model, modified according to an embodiment of the present invention, with added switching state constraints.

Alternatively, as shown in FIG. 22, the SLDS 560 can be modified to include inputs 562, i.e., controls, to the switching state. The modified SLDS 560 is then described by the following equation:

$$Pr(s_{t+1}=i|s_t=j, a_{t+1}=k)=\Pi^{(a)}(i,j,k)$$

where $a_t$ represents the control of the switching state at time t, and $\Pi^{(a)}(i,j,k)$ defines a conditioned switching state transition matrix which depends on the control $a_t$ 562.

Using the switching control $a_t$ 562, constraints imposed on the switching states can be satisfied. Such constraints can be formulated similarly to constraints for the continuous control input of FIG. 21, e.g., switching state constraints, switching input constraints and minimum-time constraints. For example, a switching state constraint can guarantee that a figure is in the walking motion regime from time $t_s$ to $t_e$. To find an optimal control $\hat{a}_t$ that satisfies those constraints, one would have to use a modified value function that includes the cost of the switching state control. A framework for the switching state optimal control could be derived from the theory of reinforcement learning and Markov decision processes. See, for example, Sutton, R. S. and Barto, A. G., "Reinforcement Learning: An Introduction," Cambridge, Mass., MIT Press, 1998.

For example, one would like to find at which minimizes the following value function, $$V^{(s)} = -\left\langle \sum_{t=0}^{T-1} \gamma^t c_t(s_t, s_{t-1}, a_t) \right\rangle$$

Here, $c_t(s_t,s_{t-1},a_t)$ represents a cost for making the transition from switching state $s_{-1}$ to $s_t$, for a given control $a_t$, and $\gamma$ is a discount or "forgetting" factor. The cost function $c_t$ is designed to emphasize, with a low $c_t$, those states that agree with imposed constraints, and to penalize, with a high $c_t$, those states that violate the imposed constraints. Once the optimal control at has been designed, the modified generative SLDS model can be driven by noise to produce a synthetic trajectory.

Figure 23:
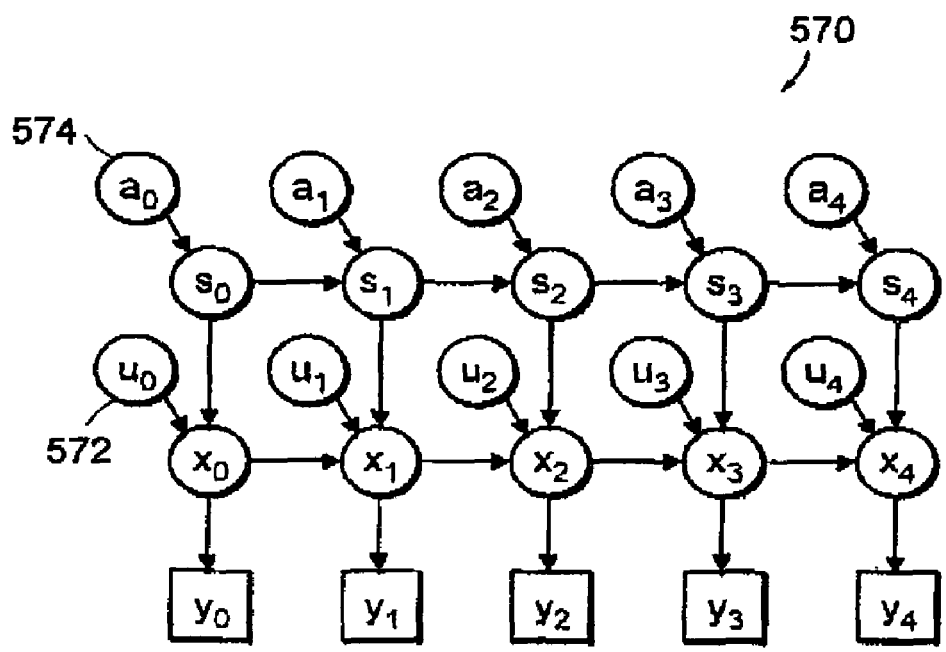
FIG. 23 is a dependency graph of an SLDS model, modified according to an embodiment of the present invention, with both added continuous and switching state constraints.

As FIG. 23 illustrates, the SLDS system 750 can be modified to include both types of controls, continuous 572 and switching 574, as indicated by the following equation.

$$x_{t+1}A(s_{t+1})x_t+u_{t+1}+v(s_{t+1}) \ Pr(s_{t+1}=i|s_t=j,a_{t+1}=k)= \Pi^{(a)}(i,j,k)$$

In this model 570, the mixed control $(u_t, a_t)$ can lead to both a desired switching state, e.g., motion regime, and a desired continuous state, e.g., figure posture. For example, a constraint can be specified that requires the human figure to be in the walking regime $i_d$ with some specific posture $x_d$ at time t. As in the case of the continuous and switching state optimal controls, additional constraints such as input bounding and minimum time can also be specified for the mixed state control. To find the optimal control $(\hat{u}_t, \hat{a}_t)$, a value function can be used that includes the costs of the switching and the continuous state controls, e.g., $V^{(x)}+V^{(s)}$. Again, once the optimal control $(\hat{u}_t, \hat{a}_t)$ is designed, the modified generative SLDS model can be used to produce a synthetic trajectory.

Figure 24:
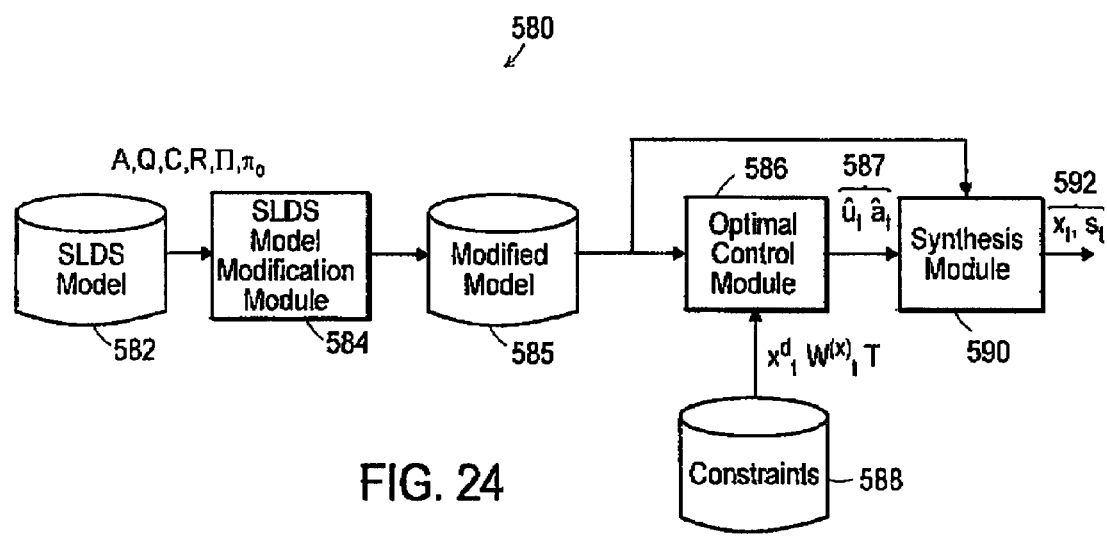
FIG. 24 is a block diagram of the framework for a synthesis embodiment of the present invention using constraints and utilizing optimal control.

FIG. 24 illustrates the framework 580, for synthesis under constraints, which utilizes optimal control. The SLDS model 582 is modified by a SLDS model modification module 584 to include the control terms or inputs. Using the modified model 585, an optimal control module 586 finds the optimal controls 587 which satisfy constraints 588. Finally, a synthesis model 590 generates synthesized trajectories 592 from the modified SLDS 585 and the optimal controls 587.

The use of optimal controls by the present invention to generate motion by sampling from SLDS models in the presence of constraints has broad applications in computer animation and computer graphics. The task of generating realistic or compelling motions for synthetic characters has long been recognized as an extremely challenging problem. One classical approach to this problem is based on the notion of spacetime constraints which was first introduced by Andrew Witkin and Michael Kass, "Spacetime Constraints," Computer Graphics, Volume 22, Number 4, August 1988 pages 159–168. In this approach, an optimal control problem is formulated over an analytic dynamical model derived from Newtonian physics. For example, in order to make a lamp hop in a realistic way, the animator would derive the physical equations which govern the lamp's motion. These equations involve the mass distribution of the lamp and forces such as gravity that are acting upon it.

Unfortunately, this method of animation has proved to be extremely difficult to use in practice. There are two main problems. First, it is extremely difficult to specify all of the equations and parameters that are necessary to produce a desired motion. In the case of the human figure, for example, specifying all of the model parameters required for realistic motion is a daunting task. The second problem is that the resulting equations of motion are highly complex and non-linear, and usually involve an enormous number of state variables. For example, the jumping Luxo lamp described in the Witkin and Kass paper involved 223 constraints and 394 state variables. The numerical methods which must be used to solve control problems in such a large complex state space are also difficult to work with. Their implementation is complex and their convergence to a correct solution can be problematic.

In contrast, our approach of optimal control of learned SLDS models has the potential to overcome both of these drawbacks. By using a learned switching model, desired attributes such as realism can be obtained directly from motion data. Thus, there is no need to specify the physics of human motion explicitly in order to obtain useful motion synthesis. By incorporating additional constraints through the mechanism of optimal control, we enable an animator to achieve specific artistic goals by controlling the synthesized motion. One potential advantage of our optimal control framework over the classical spacetime approach is the linearity of the SLDS model once a switching sequence has been specified. This makes it possible to use optimal control techniques such as the linear quadratic regulator which are extremely stable and well-understood. Implementations of LQR can be found in many standard software packages such as Matlab. This stands in contrast to the sequential quadratic programming methods required by the classical spacetime approach.

The spacetime approach can be extended to include the direct use of motion capture data. This is described in Michael Gleicher, "Retargetting Motion to New Characters," Proceedings of SIGGRAPH 98, in Computer Graphics Proceedings, Annual Conference series, 1998, pages 33–42. In this method, a single sequence of human motion data is modified to achieve a specific animation objective by filtering it with a biomechanical model of human motion and adjusting the model parameters. With this method, a motion sequence of a person walking can be adapted to a figure model whose proportions are different from that of the subject. Motions can also be modified to satisfy various equality or inequality constraints.

The use of motion capture data within the spacetime framework makes it possible to achieve realistic motion without the complete specification of biomechanical model parameters. However this approach still suffers from the complexity of the underlying numerical methods. Another disadvantage of this approach in contrast to the current invention is that there is no obvious way to generate multiple examples of the same type of motion or to generate new motions by combining several examples of motion data.

In contrast, sampling repeatedly from our SLDS framework can produce motions which differ in their small details but are qualitatively consistent. This type of randomness is necessary in order to avoid awkward repetitions in an animation application. Furthermore, the learning approach makes it possible to generalize from a set of motions to new motions that have not been seen before. In contrast, the approach of retargeting is based on modifying a single instance of motion data.

Another approach to synthesizing animations from learned models is described in Matthew Brand, "Voice Puppetry," SIGGRAPH 99 Conference Proceedings, Annual Conference Series 1999, pages 21–28 and in Matthew Brand and Aaron Hertzmann, "Style Machines," SIGGRAPH 2000 Conference Proceedings, Annual Conference Series 2000, pages 183–192. This method uses sampling from a Hidden Markov Model to synthesize facial and figure animations learned from training data. Unlike our SLDS framework, the HMM representation is limited to using piecewise constant functions to model the feature data during learning. This can require a large number of discrete states in order to capture subtle effects when working with complex state space data.

In contrast, our framework employs a set of LDS models to describe feature data, resulting in models with much more expressive power. Furthermore, the prior art does not describe any mechanism for imposing constraints on the samples from the models. This may make it difficult to use this approach in achieving specific animation objectives.

To test the power of the learned SLDS synthesis/interpolation framework, we examined its use in synthesizing realistic-looking motion sequences and interpolating motion between missing frames. In one set of experiments, the learned walk/jog SLDS was used to generate a "synthetic walk" based on initial conditions learned by the SLDS model.

Figure 25:
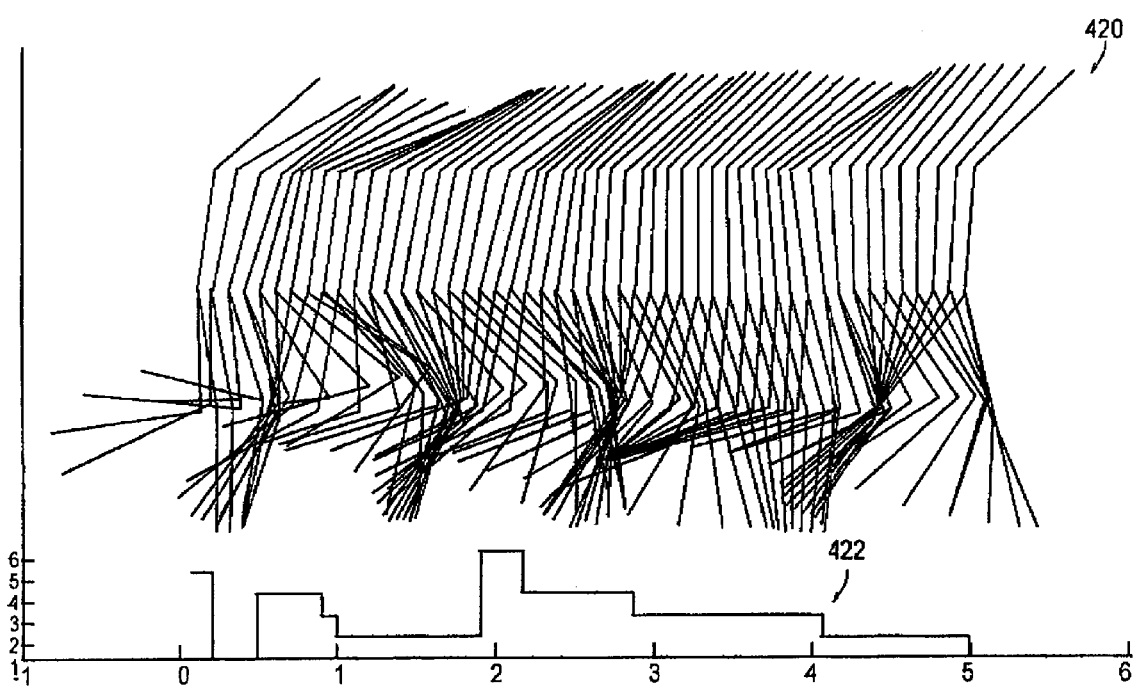
FIG. 25 is an illustration of a stick figure motion sequence as synthesized by an embodiment of the present invention.

FIG. 25 illustrates a stick figure 220 motion sequence of the noise driven model. Depending on the amount of noise used to drive the model, the stick figure exhibits more or less "natural"-looking walk. Departure from the realistic walk becomes more evident as the simulation time progresses. This behavior is not unexpected as the SLDS in fact learns locally consistent motion patterns. FIG. 25 illustrates a synthesized walk motion over 50 frames using SLDS as a generative model. The states of the synthesized motion are shown on the graph 222.

Another realistic situation may call for filling in a small number of missing frames from a large motion sequence. SLDS can then be utilized as an interpolation function. In another set of experiments, we employed the learned walk/jog model to interpolate a walk motion over two sequences with missing frames. Missing-frame constraints were included in the interpolation framework by setting the measurement variances corresponding to those frames to infinity. The visual quality of the interpolation and the motion synthesized from it was high. As expected, the sparseness of the measurement set had definite bearing on this quality.

USE OF THE INVENTION

Our invention makes possible a number of core tasks related to the analysis and synthesis of the human figure motion:
  Track figure motion in an image sequence using learned dynamic models.
  Classify different types of human motion.
  Synthesize motion using stochastic models that correspond to different types of motion.
  Interpolate missing motion data from sparsely observed image sequences.

We anticipate that our invention could impact the following application areas:
  Surveillance: Use of accurate dynamic models could lead to improved tracking in noisy video footage. The ability to interpolate missing data could be useful in situations where frame rates are low, as in Web or other network applications. The ability to classify motion into categories can benefit from the SLDS approach. Two forms of classification are possible. First, specific actions such as "opening a door" or "dropping a package" can be modeled using our approach. Second, it may be possible to recognize specific individuals based on the observed dynamics of their motion in image sequences. This could be used, for example, to recognize criminal suspects using surveillance cameras in public places such as airports or train stations.
  User-interfaces: Interfaces based on vision sensing could benefit from improved tracking and better classification performance due to the SLDS approach.
  Motion capture: Motion capture in unstructured environments can be enabled through better tracking techniques. In addition to the capture of live motion without the use of special clothing, it is also possible to capture motion from archival sources such as old movies.
  Motion synthesis: The generation of human motion for computer graphics animation can be enabled through the use of a learned, generative stochastic model. By learning models from sample motions, it is possible to capture the natural dynamics implicit in real human motion without a laborious manual modeling process. Because the resulting models are stochastic, sampling from the models produces motion with a pleasing degree of randomness.
  Video editing: Tracking algorithms based on powerful dynamic models can simplify the task of segmenting video sequences.
  Video compression/decompression: The ability to interpolate a video sequence based on a sparse set of samples could provide a new approach to coding and decoding video sequences containing human or other motion. In practice, human motion is common in video sequences. By transmitting key frames detected using SLSDS classification at a low sampling rate and interpolating, using SLDS interpolation, the missing frames from the transmitted model parameters, a substantial savings in bit-rate may be achievable.

It will be apparent to those of ordinary skill in the art that methods involved in the present system for a method for motion synthesis and interpolation using switching linear dynamic system models may be embodied in a computer program product that includes a computer usable medium. For example, such a computer usable medium can include a readable memory device, such as a hard drive device, a CD-ROM, a DVD-ROM, or a computer diskette, having computer readable program code segments stored thereon. The computer readable medium can also include a communications or transmission medium, such as a bus or a communications link, either optical, wired, or wireless, having program code segments carried thereon as digital or analog data signals.

While this invention has been particularly shown and described with references to preferred embodiments thereof, it will be understood by those skilled in the art that various changes in form and details may be made therein without departing from the scope of the invention encompassed by the appended claims.

What is claimed is:

1. A computer implemented method for synthesizing a data sequence representing figure or human motion, comprising:
  defining a switching linear dynamic system (SLDS) comprising a plurality of dynamic models;

associating each model with a switching state such that a model is selected when its associated switching state is true;

determining a state transition record for at least one training sequence of measurements by determining and recording, for a given measurement and for each possible switching state, an optimal prior switching state, based on the at least one training sequence, wherein the optimal prior switching state optimizes a transition probability;

determining, for a final measurement, an optimal final switching state;

determining the sequence of switching states by backtracking, from said optimal final switching state, through the state transition record;

learning parameters of the dynamic models, responsive to the determined sequence of switching states; and synthesizing a new data sequence, based on the dynamic models with learned parameters.

2. The method of claim 1, wherein the new data sequence has characteristics which are similar to characteristics of at least one training sequence.

3. The method of claim 1, wherein the new data sequence combines characteristics of plural training sequences.

4. The method of claim 1, further comprising modifying the SLDS such that at least one constraint is met.

5. The method of claim 4, wherein modifying the SLDS comprises:

adding a continuous state control.

6. The method of claim 5, wherein modifying the SLDS further comprises:

adding constraints on continuous states.

7. The method of claim 5, wherein modifying the SLDS further comprises:

adding constraints on the continuous state control.

8. The method of claim 5, wherein modifying the SLDS further comprises:

adding constraints on time.

9. The method of claim 5, further comprising:

designing an optimal continuous control that satisfies the at least one constraint.

10. The method of claim 9, further comprising:

synthesizing the new data sequence using the optimal continuous control.

11. The method of claim 4, wherein modifying the SLDS comprises:

adding a switching state control.

12. The method of claim 11, wherein modifying the SLDS further comprises:

adding constraints on switching states.

13. The method of claim 12, wherein modifying the SLDS further comprises:

adding constraints on the switching state control.

14. The method of claim 12, further comprising:

designing an optimal switching control that satisfies constraints.

15. The method of claim 14, further comprising:

synthesizing the new data sequence using the optimal switching control.

16. The method of claim 4, further comprising designing optimal switching and continuous state controls that satisfy switching and continuous constraints respectively.

17. The method of claim 16, further comprising:

synthesizing the new data sequence using the optimal switching and continuous state controls.

18. The method of claim 1, wherein the training sequence of measurements comprises economic data.

19. The method of claim 1, wherein the training sequence of measurements comprises image data.

20. The method of claim 1, wherein the training sequence of measurements comprises audio data.

21. The method of claim 1, wherein the training sequence of measurements comprises spatial data.

22. Computer apparatus for synthesizing figure motion using a switching linear dynamic system (SLDS) model, and comprising:

a plurality of linear dynamic system (SLDS) models, wherein at any given instance, an LDS model is selected responsive to a switching variable;

a state transition recorder which determines, for at least one training sequence of measurements, a state transition record by determining and recording, for a given measurement and for each possible switching state, an optimal prior switching state, based on the at least one training sequence, wherein the optimal prior switching state optimizes a transition probability, and which determines, for a final measurement, an optimal final switching state;

a backtracker which determines a sequence of switching states corresponding to the training sequence by backtracking, from said optimal final switching state, through the state transition record;

a dynamic model learner which learns parameters of the dynamic models responsive to the determined sequence of switching states; and a synthesizer which synthesizes a new data sequence, based on dynamic models with learned parameters.

23. Computer apparatus of claim 22, wherein the new data sequence has characteristics similar to at least one training sequence.

24. Computer apparatus of claim 22, wherein the new data sequence combines characteristics of plural training sequences.

25. A computer system for synthesizing a data sequence representing figure or human motion, comprising:

means for defining a switching linear dynamic system (SLDS) comprising a plurality of dynamic models;

means for associating each model with a switching state such that a model is selected when its associated switching state is true;

means for determining a state transition record for at least one training sequence of measurements by determining and recording, for a given measurement and for each possible switching state, an optimal prior switching state, based on the at least one training sequence, wherein the optimal prior switching state optimizes a transition probability;

means for determining, for a final measurement, an optimal final switching state;

means for determining the sequence of switching states by backtracking, from said optimal final switching state, through the state transition record;

means for learning parameters of the dynamic models, responsive to the determined sequence of switching states; and means for synthesizing a new data sequence, based on the dynamic models with learned parameters.

26. A computer program product for synthesizing a data sequence representing figure or human motion, the computer program product comprising a computer readable storage medium having computer executable code thereon, including program code which:

defines a switching linear dynamic system (SLDS) comprising a plurality of dynamic models;

associates each model with a switching state such that a model is selected when its associated switching state is true;
determines a state transition record for at least one training sequence of measurements by determining and recording, for a given measurement and for each possible switching state, an optimal prior switching state, based on the at least one training sequence, wherein the optimal prior switching state optimizes a transition probability;
determines an optimal final switching state for a final measurement;
determines the sequence of switching states by backtracking, from said optimal final switching state, through the state transition record;
learns parameters of the dynamic models, responsive to the determined sequence of switching states; and
synthesizes a new data sequence, based on the dynamic models with learned parameters.

27. A computer system for performing motion synthesis and interpolation comprising:
a processor;
a memory system connected to the processor; and
a computer program, in the memory, which;
associates each of a plurality of dynamic models with a switching state such that a model is selected when its associated switching state is true;
determines a state transition record for at least one training sequence of measurements by determining and recording, for a given measurement and for each possible switching state, an optimal prior switching state, based on the at least one training sequence, wherein the optimal prior switching state optimizes a transition probability;
determines an optimal final switching state for a final measurement;
determines a sequence of switching states by backtracking, from said optimal final switching state, through the state transition record;
learns parameters of the dynamic models, responsive to the determined sequence of switching states; and
synthesizes a new data sequence, based on the dynamic models with learned parameters.

28. A computer implemented method for synthesizing a data sequence representing figure motion, comprising:
defining a switching linear dynamic system (SLDS) comprising a plurality of dynamic models;
associating each dynamic model with a switching state such that a dynamic model is selected when its associated switching state is true, wherein the switching state at a particular instance is determined by a switching model;
decoupling the dynamic models from the switching model;
determining parameters of a decoupled dynamic model, responsive to a switching state probability estate;
estimating a state of a decoupled dynamic model corresponding to a measurement at the particular instance, and responsive to at least one training sequence of measurements;
determining parameters of the decoupled switching model, responsive to the dynamic state estimate;
estimating a probability for each possible switching state of the decoupled switching model;
determining a switching state sequence based on the estimated switching state probabilities;
learning parameters of the dynamic models, responsive to the switching states sequence; and
synthesizing a new data sequence, based on the dynamic models with learned parameters.

29. The method of claim 28, wherein the new data sequence has characteristics similar to at least one training sequence.

30. The method of claim 28, wherein the new data sequence combines characteristics of plural training sequences.

31. The method of claim 28, further comprising modifying the SLDS such that at least one constraint is met.

32. The method of claim 31, wherein modifying the SLDS further comprises:
adding a continuous state control.

33. The method of claim 32, wherein modifying the SLDS further comprises:
adding constraints on continuous states.

34. The method of claim 32, wherein modifying the SLDS further comprises:
adding constraints on the continuous state control.

35. The method of claim 32, wherein modifying the SLDS further comprises:
adding constraints on time.

36. The method of claim 32, further comprising:
designing an optimal continuous control that satisfies the at least one constraint.

37. The method of claim 36, further comprising:
synthesizing the new data sequence using the optimal continuous control.

38. The method of claim 31, wherein modifying the SLDS comprises:
adding a switching state control.

39. The method of claim 38, wherein modifying the SLDS further comprises:
adding constraints on switching states.

40. The method of claim 39, wherein modifying the SLDS further comprises:
adding constraints on the switching state control.

41. The method of claim 39, further comprising:
designing an optimal switching control that satisfies constraints.

42. The method of claim 41, further comprising:
synthesizing the new data sequence using the optimal switching control.

43. The method of claim 31, further comprising designing optimal switching and continuous state controls that satisfy switching and continuous constraints respectively.

44. The method of claim 43, further comprising:
synthesizing the new data sequence using the optimal switching and continuous state controls.

45. Computer apparatus for motion synthesis and interpolation using a switching linear dynamic system (SLDS) model, comprising:
a plurality of linear dynamic system (LDS) models, wherein at any given instance, an LDS model is selected responsive to a switching variable;
a switching model which determines values of the switching variable;
an approximate variational state sequence inference module, which reestimates parameters of each LDS model, using variational inference, to minimize a modeling cost of current state sequence estimates, responsive to at least one training sequence of measurements; and
a synthesizer which synthesizes a new data sequence, based on the reestimated LDS models.

46. Computer apparatus of claim 45, wherein the new data sequence has characteristics similar to the at least one training sequence.

47. Computer apparatus of claim 45, wherein the new data sequence combines characteristics of plural training sequences.

48. Computer apparatus of claim 45, further comprising modifying the SLDS such that at least one constraint is met.

49. Computer apparatus of claim 48, wherein modifying the SLDS comprises:
adding a continuous state control.

50. Computer apparatus of claim 48, wherein modifying the SLDS comprises:
adding a switching state control.

51. Computer apparatus of claim 48, further comprising designing optimal switching and continuous state controls that satisfy switching and continuous constraints respectively.

52. Computer apparatus of claim 51, further comprising:
synthesizing the new data sequence using the optimal switching and continuous state controls.

53. A computer implemented method for synthesizing figure motion by interpolating from an input measurement sequence, comprising:
defining a switching linear dynamic system (SLDS) comprising a plurality of dynamic models;
associating each model with a switching state such that a model is selected when its associated switching state is true;
determining a state transition record by determining and recording, for a given measurement and for each possible switching state, an optimal prior switching state;
based on at least one training measurement sequence, wherein the optimal prior switching state optimizes a transition probability;
determining, for a final measurement, an optimal final switching state;
determining the sequence of switching states by backtracking, from said optimal final switching state, through the state transition record;
determining the sequence of continuous states based on the determined sequence of switching states; and
interpolating missing motion data from the input measurement sequence, based on dynamic models and responsive to the determined sequences of continuous and switching states.

54. The method of claim 53, further comprising modifying the SLDS such that at least one constraint is met.

55. The method of claim 54, wherein modifying the SLDS comprises:
adding a continuous state control.

56. The method of claim 54, wherein modifying the SLDS comprises:
adding a switching state control.

57. The method of claim 54, further comprising designing optimal switching and continuous state controls that satisfy switching and continuous constraints respectively.

58. The method of claim 57, further comprising:
interpolating the new data sequence using the optimal switching and continuous state controls.

59. The method of claim 53, further comprising:
at a receiver, interpolating missing frames from transmitted model parameters and from received key frames, the key frames having been determined based on the learned parameters, wherein the input measurement sequence comprises the received key frames.

60. Computer apparatus for motion synthesis and interpolation using a switching linear dynamic system (SLDS) model, comprising:
a plurality of linear dynamic system (LDS) models, wherein at any given instance, an LDS model is selected responsive to a switching variable;
a state transition recorder which determines a state transition record for a training measurement sequence by determining and recording, for a given measurement and for each possible switching state, an optimal prior switching state, based on the training sequence, wherein the optimal prior switching state optimizes a transition probability, and which determines, for a final measurement, an optimal final switching state;
a backtracer which determines a sequence of switching states corresponding to the training sequence by backtracking, from said optimal final switching state, through the state transition record;
a dynamic model learner which learns parameters of the dynamic models responsive to the determined sequence of switching states; and
an interpolator which interpolates missing motion data from an input sequence, based on the dynamic models with learned parameters.

61. A computer system for synthesizing figure motion by interpolating from an input measurement sequence, the system comprising:
means for defining a switching linear dynamic system (SLDS) comprising a plurality of dynamic models;
means for associating each model with a switching state such that a model is selected when its associated switching state is true;
means for determining a state transition record by determining and recording, for a given measurement and for each possible switching state, an optimal prior switching state, based on at least one training sequence, wherein the optimal prior switching state optimizes a transition probability;
means for determining, for a final measurement, an optimal final switching state;
means for determining the sequence of switching states by backtracking, from said optimal final switching state, through the state transition record;
means for learning parameters of the dynamic models, responsive to the determined sequence of switching states; and
means for interpolating missing motion data from the input measurement sequence, based on dynamic models learned from training sequences.

62. A computer program product for synthesizing figure motion by interpolating from an input measurement sequence, the computer program product comprising a computer readable storage medium having computer executable code thereon, including program code which:
associates each of a plurality of dynamic models with a switching state such that a model is selected when its associated switching state is true;
determines a state transition record by determining and recording, for a given measurement and for each possible switching state, an optimal prior switching state, based on at least one training measurement sequence, wherein the optimal prior switching state optimizes a transition probability;
determines an optimal final switching state for a final measurement;
determines the sequence of switching states by backtracking, from said optimal final switching state, through the state transition record;
learns parameters of the dynamic models, responsive to the determined sequence of switching states resulting; and interpolates missing motion data from the input measurement sequence, based on the dynamic models with learned parameters.

63. A computer system for motion synthesis and interpolation comprising:
   a processor;
   a memory system connected to the processor; and
   a computer program, in the memory, which:
   associates each of a plurality of dynamic models with a switching state such that a model is selected when its associated switching state is true;
   determines, from a set of possible switching states and responsive to a training sequence of measurements, a state transition record by determining and recording, for a given measurement and for each possible switching state, an optimal prior switching state, wherein the optimal prior switching state optimizes a transition probability;
   determines an optimal final switching state for a final measurement;
   determines a sequence of switching states corresponding to the measurement sequence by backtracking, from said optimal final switching state, through the state transition record;
   learns parameters of the dynamic models, responsive to the determined sequence of switching states; and
   interpolates missing motion data from an input sequence, based on the dynamic models with learned parameters.

64. A computer implemented method for synthesizing motion by interpolating from an input measurement sequence, comprising:
   defining a switching linear dynamic system (SLDS) comprising a plurality of dynamic models;
   associating each dynamic model with a switching state such that a dynamic model is selected when its associated switching state is true, wherein the switching state at a particular instance is determined by a switching model;
   decoupling the dynamic models from the switching model;
   determining parameters of a decoupled dynamic model, responsive to a switching state probability estimate;
   estimating a state of a decoupled dynamic model corresponding to a measurement at the particular instance, and responsive to at least one training sequence of measurements;
   determining parameters of the decoupled switching model, responsive to the dynamic state estimate;
   estimating a probability for each possible switching state of the decoupled switching model;
   determining the sequence of switching states based on the estimated switching state probabilities;
   learning parameters of the dynamic models, responsive to the determined sequence of switching states; and
   interpolating missing motion data from the input measurement sequence, based on the dynamic models with learned parameters.

65. The method of claim 64, further comprising modifying the SLDS such that at least one constraint is met.

66. The method of claim 65, wherein modifying the SLDS comprises:
   adding a continuous state control.

67. The method of claim 65, wherein modifying the SLDS comprises:
   adding a switching state control.

68. The method of claim 65, further comprising designing optimal switching and continuous state controls that satisfy switching and continuous constraints respectively.

69. The method of claim 68, further comprising:
   synthesizing the new data sequence using the optimal switching and continuous state controls.

70. The method of claim 64, wherein the measurement sequence comprises a sparsely observed image sequence.

71. The method of claim 64, further comprising:
   at a receiver, interpolating missing frames from transmitted model parameters and from received key frames, the key frames having been determined based on the learned parameters.

72. Computer apparatus for motion synthesis and interpolation using a switching linear dynamic system (SLDS) model, comprising:
   a plurality of linear dynamic system (LDS) models, wherein at any given instance, an LDS model is selected responsive to a switching variable;
   a switching model which determines values of the switching variable;
   an approximate variational state sequence inference module, which reestimates parameters of each LDS model, using variational inference, to minimize a modeling cost of current state sequence estimates;
   a dynamic model learner which learns parameters of the LDS models responsive to determined sequence of switching states resulting from at least one training sequence; and
   an interpolator which interpolates missing motion data from an input sequence, based on the dynamic models with learned parameters.

* * * * *

UNITED STATES PATENT AND TRADEMARK OFFICE
CERTIFICATE OF CORRECTION

| | |
|---|---|
| PATENT NO. | : 6,993,462 B1 |
| APPLICATION NO. | : 09/654401 |
| DATED | : January 31, 2006 |
| INVENTOR(S) | : Vladimir Pavlovic et al. |

It is certified that error appears in the above-identified patent and that said Letters Patent is hereby corrected as shown below:

In column 32, line 35, delete " $[[\hat{X}_{t|t,i}]]\hat{x}_{t|t,i} \stackrel{\Delta}{=} \langle x_t | Y_t, s_T = e_i \rangle$ "

and insert -- $\hat{x}_{t|t,i} \stackrel{\Delta}{=} \langle x_t | Y_t, s_T = e_i \rangle$ --, therefor.

In column 14, below line 2, insert -- for t=1:T-1    (Steps 104, 122) --.

In column 14, above line 3, insert -- for i=1:S    (Steps 106, 120) --.

In column 15, line 57, delete " $\langle x_t \rangle = E[x_t | U_T]$ " and insert -- $\langle x_t \rangle = E[x_t | Y_T]$ --, therefor.

In column 17, line 50, delete

" Initialize $Pr(s_0 = i) = p(i)$, for i=0, . . . ,S-1;            (Step 202) ".

In column 26, line 4, delete "j*→i" and insert -- $j \rightarrow i$ --, therefor.

In column 26, line 23, delete "j=arg" and insert -- j*=arg --, therefor.

In column 31, line 15, after "state" delete "$S_{-1}$" and insert -- $S_{t-1}$ --, therefor.

In column 36, line 10, in Claim 22, delete "(SLDS)" and insert -- (LDS) --, therefor.

In column 37, line 24, in Claim 27, delete "which;" and insert -- which: --, therefor.

In column 37, line 55, in Claim 28, delete "estate;" and insert -- estimate; --, therefor.

Signed and Sealed this
Twelfth Day of July, 2011

David J. Kappos
*Director of the United States Patent and Trademark Office*